(12) United States Patent
Zhao et al.

(10) Patent No.: US 11,568,411 B2
(45) Date of Patent: Jan. 31, 2023

(54) FACIAL RECOGNITION-BASED PAYMENT METHOD, APPARATUS, AND TERMINAL

(71) Applicant: Huawei Technologies Co., Ltd., Shenzhen (CN)

(72) Inventors: Xiaona Zhao, Beijing (CN); Chen Dong, Shenzhen (CN); Xinmiao Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/052,409

(22) PCT Filed: May 3, 2018

(86) PCT No.: PCT/CN2018/085486
§ 371 (c)(1),
(2) Date: Nov. 2, 2020

(87) PCT Pub. No.: WO2019/210487
PCT Pub. Date: Nov. 7, 2019

(65) Prior Publication Data
US 2021/0192528 A1    Jun. 24, 2021

(51) Int. Cl.
*G06Q 20/40* (2012.01)
*G06Q 20/10* (2012.01)
(Continued)

(52) U.S. Cl.
CPC ..... *G06Q 20/40145* (2013.01); *G06Q 20/102* (2013.01); *G06Q 20/326* (2020.05);
(Continued)

(58) Field of Classification Search
None
See application file for complete search history.

(56) References Cited

U.S. PATENT DOCUMENTS

| | | | |
|---|---|---|---|
| 2017/0161750 A1 | 6/2017 | Yao et al. | |
| 2018/0075443 A1 | 3/2018 | Fischer et al. | |
| 2018/0307819 A1* | 10/2018 | Yuan | H04N 5/23258 |

FOREIGN PATENT DOCUMENTS

| | | |
|---|---|---|
| CN | 104184589 A | 12/2014 |
| CN | 104537534 A | 4/2015 |
| | (Continued) | |

OTHER PUBLICATIONS

Piaoliu, "Face ID Stirs Face Recognition? Face-swipe applications in four financial domains in domestic," Mobile Payments.com, retrieved from https://www.mpaypass.com.cn/news/201709/13175014.html, Sep. 13, 2017, 12 pages.

*Primary Examiner* — Scott S Trotter
*Assistant Examiner* — Amit Patel
(74) *Attorney, Agent, or Firm* — Conley Rose, P.C.

(57) ABSTRACT

A face recognition-based method includes, when a terminal detects a placement posture on the terminal, obtaining placement posture information of the terminal, where the placement posture information is used to determine a tilt angle of the terminal relative to a first plane; performing facial recognition on a user when determining that a tilt angle meets a preset range without notifying the user and regardless of detecting an action of the terminal other than obtaining the placement posture information; and opening the application when the facial recognition succeeds.

20 Claims, 17 Drawing Sheets

A facial recognition module is triggered when a mobile phone tilts close to a POS

(51) Int. Cl.
*G06Q 20/32* (2012.01)
*G06V 40/16* (2022.01)

(52) U.S. Cl.
CPC ..... *G06Q 20/3274* (2013.01); *G06Q 20/3278* (2013.01); *G06V 40/172* (2022.01)

(56) References Cited

FOREIGN PATENT DOCUMENTS

| | | | |
|---|---|---|---|
| CN | 104766206 | A | 7/2015 |
| CN | 105184553 | A | 12/2015 |
| CN | 105678290 | A | 6/2016 |
| CN | 105894284 | A | 8/2016 |
| CN | 106095295 | A | 11/2016 |
| CN | 106204033 | A | 12/2016 |
| CN | 106393638 | A | 2/2017 |
| CN | 106600855 | A | 4/2017 |
| CN | 106875191 | A | 6/2017 |
| CN | 104361493 | B | 12/2018 |
| WO | 2016187976 | A1 | 12/2016 |

\* cited by examiner

FACIAL RECOGNITION-BASED PAYMENT METHOD, APPARATUS, AND TERMINAL

CROSS-REFERENCE TO RELATED APPLICATIONS

This application is a U.S. National Stage of International Patent Application No. PCT/CN2018/085486 filed on May 3, 2018, which is hereby incorporated by reference in its entirety.

TECHNICAL FIELD

This application relates to the payment field or the mobile payment field, and in particular, to a facial recognition-based payment method, apparatus, and terminal.

BACKGROUND

With popularization of mobile payment manners, security of mobile payment draws increasing attention. In a mobile payment process, user identity authentication is most important. In addition, payment convenience gradually attracts people's attention.

Currently, common mobile payment manners include graphic code payment (for example, at least one of two-dimensional code payment and bar code payment), near field communication (near field communication, NFC) payment, and the like. For the first payment method, for example, a merchant provides a receipt code, and a user scans the receipt code for payment (as shown in FIG. 1), or a user provides a payment code, and a merchant scans the payment code for payment collection (as shown in FIG. 2). In this case, the user usually needs to manually enter a password or perform fingerprint verification to complete the payment. For the second payment method, for example, an electronic wallet is installed on a mobile phone to simulate the mobile phone as a card, the user needs to place the mobile phone in a sensing area of a point of sale (point of sale, POS) terminal, and the mobile phone prompts the user to manually enter a password (as shown in FIG. 3a) or perform fingerprint verification (as shown in FIG. 3b). In this case, the user needs to actively pick up the mobile phone, enter a payment password or a fingerprint, and put the mobile phone close to a POS machine again to complete the payment, or the user may enter a payment password or a fingerprint in a process of keeping the mobile phone close to the POS machine to complete the payment. For the latter, the user needs to keep movements steady; otherwise, once the mobile phone is not in the sensing area of the POS machine, the user needs to put the mobile phone close to the sensing area again for payment. In the foregoing payment methods, the user usually needs to actively enter identity authentication information such as a password and a fingerprint, especially, the NFC payment may further cause a problem of moving close to the POS machine again. Therefore, operation steps are not simplified, and payment efficiency is affected.

With development of an identity authentication manner and a change in a requirement for convenience and security, a facial recognition technology already meets an engineering implementation requirement in scenarios such as payment, access control, and unlocking. For example, Apple has applied the facial recognition technology to mobile payment. However, (as shown in FIG. 4a, FIG. 4b, and FIG. 4c), a user needs to open an electronic wallet (for example, apple pay) in advance. As shown in FIG. 4a, a mobile phone prompts to perform verification of facial recognition (for example, enter a face ID). As shown in FIG. 4b, after the recognition succeeds, the mobile phone prompts, by using a mobile phone screen, to move the mobile phone close to a POS machine (for example, hold near reader). As shown in FIG. 4c, payment (for example, done) is completed. Currently, proactive triggering by a user is still needed, the operation is complex, the efficiency is low, and the experience needs to be optimized.

SUMMARY

Embodiments of this application provide a face recognition-based payment method, apparatus, and terminal, to implement an identity authentication solution with more streamlined experience and higher efficiency.

According to a first aspect, an embodiment of this application provides a face recognition-based payment method. The method specifically includes: obtaining placement posture information of a terminal when the terminal detects a payment event, where the placement posture information is used to determine a tilt angle of the terminal relative to a first plane; performing, by the terminal, facial recognition on a user when determining that the tilt angle meets a preset range; and when the facial recognition succeeds, performing, by the terminal, a payment operation corresponding to the payment event.

In this solution, in the method provided in this embodiment of the present invention, a best time point is determined based on an actual status (for example, placement posture information, or even APP information and a purpose of the preset event) of a mobile phone in a preset event (for example, entering an NFC radio-frequency field or identifying a graphic code), to trigger a facial recognition processing unit. Regardless of whether the graphic code is being identified or the mobile phone is picked up after the graphic code is identified, or whether the terminal is approaching a POS machine or the terminal is picked up when the terminal leaves the POS machine, a facial recognition technology that the user does not perceive and has relatively good experience can be used to verify a user identity to a relatively large extent and relatively efficiently.

In an optional implementation, the "payment event" may include: the terminal enters a near field communication NFC radio-frequency field; or the terminal uses a first application on the terminal or a second application in the first application; or a first application that is on the terminal and that is used by the terminal or a second application that is in the first application and that is used by the terminal requires user identity authentication.

In another optional implementation, before the obtaining placement posture information of a terminal when the "terminal" detects a payment event, the method may further include: determining, by the terminal, that there is no stored face image information on the terminal, where the stored face image information is face image information that is stored on the terminal when the terminal leaves the NFC radio-frequency field in a first preset time period before the terminal detects the payment event.

In still another optional implementation, the "payment event" may include: the terminal identifies a graphic code; or the terminal identifies the graphic code, and determines that the graphic code includes payment collection information or payment information, where the graphic code includes at least one of a two-dimensional code and a bar code.

In yet another optional implementation, the payment event may include: a third application on the terminal invokes an identification function on the terminal to identify the graphic code, where the third application is an application that is included in a whitelist of the terminal and that has a payment function.

In yet another optional implementation, before the step of "performing, by the terminal, facial recognition on a user when determining that the tilt angle meets a preset range", the method may further include: adjusting, by the terminal, a tilt angle of a photographing apparatus in the terminal relative to the first plane based on the obtained placement posture information of the terminal, until the tilt angle meets the preset range.

In yet another optional implementation, the step of "performing, by the terminal, facial recognition on a user when determining that the tilt angle meets a preset range" specifically includes: obtaining, by the terminal, a first image when the terminal determines that the tilt angle meets the preset range; and matching, by the terminal, the first image with a pre-recorded face image template.

In yet another optional implementation, the step of "performing, by the terminal, facial recognition on a user when determining that the tilt angle meets a preset range" specifically includes: obtaining, by the terminal, a first image when the terminal determines that the tilt angle meets the preset range; and sending, by the terminal, the first image to a server, so that the server matches the first image with a pre-recorded face image template in the server.

In yet another optional implementation, when determining that the tilt angle does not meet the preset range, the terminal performs identity authentication in a second manner. The second manner may include at least one of fingerprint recognition, iris recognition, voiceprint recognition, a digit password, and a pattern password.

In yet another optional implementation, when determining that the facial recognition fails in verification, the terminal performs identity authentication in the second manner.

In yet another optional implementation, the first plane may include at least one of planes that form any included angle with a horizontal plane.

According to a second aspect, an embodiment of this application provides a facial recognition-based payment terminal. The terminal specifically includes: one or more processors, a memory, a plurality of applications, and one or more computer programs, where the one or more computer programs are stored in the memory, the one or more computer programs include an instruction, and when the instruction is executed by the terminal, the terminal is enabled to perform the following steps:

obtaining placement posture information of the terminal when detecting a payment event, where the placement posture information is used to determine a tilt angle of the terminal relative to a first plane; performing facial recognition on a user when determining that the tilt angle meets a preset range; and when the facial recognition succeeds, performing a payment operation corresponding to the payment event.

In this solution, in the method provided in this embodiment of the present invention, a best time point is determined based on an actual status (for example, placement posture information, or even APP information and a purpose of the preset event) of a mobile phone in a preset event (for example, entering an NFC radio-frequency field or identifying a graphic code), to trigger a facial recognition processing unit (in other words, facial recognition is used to verify a user identity). Regardless of whether the graphic code is being identified or the mobile phone is picked up after the graphic code is identified, or whether the terminal is approaching a POS machine or the terminal is picked up when the terminal leaves the POS machine, a facial recognition technology that the user does not perceive and has relatively good experience can be used to verify a user identity to a relatively large extent and relatively efficiently.

In an optional implementation, the "payment event" may include: entering a near field communication NFC radio-frequency field; or using a first application or a second application in the first application; or requiring user identity authentication by the used first application or the used second application in the first application.

In another optional implementation, the "terminal" may further perform the following steps: determining that there is no stored face image information in the memory, where the stored face image information is face image information that is stored on the terminal when the terminal leaves the radio-frequency field in a first preset time period before the terminal detects the payment event.

In still another optional implementation, the "payment event" may further include: identifying a graphic code; or identifying the graphic code, and determining that the graphic code includes payment collection information or payment information, where the graphic code includes at least one of a two-dimensional code and a bar code.

In yet another optional implementation, the "payment terminal" may further perform the following step: invoking, by using a third application in the memory, an identification function on the terminal to identify the graphic code, where the third application is an application that is included in a whitelist of the memory and that has a payment function.

In yet another optional implementation, the "payment terminal" may further perform the following step: adjusting a tilt angle of a photographing apparatus in the terminal relative to the first plane based on the obtained placement posture information of the terminal, until the tilt angle meets the preset range.

In yet another optional implementation, the "payment terminal" may perform the following steps: obtaining a first image when determining that the tilt angle meets the preset range; and matching, by the processor, the first image with a pre-recorded face image template.

In yet another optional implementation, the "payment terminal" may perform the following steps: obtaining a first image when determining that the tilt angle meets the preset range; and sending the first image to a server, so that the server matches the first image with a pre-recorded face image template in the server.

In yet another optional implementation, when the tilt angle does not meet the preset range, the payment terminal may further perform the following step: performing identity authentication in a second manner, where the second manner may include at least one of fingerprint recognition, iris recognition, voiceprint recognition, a digit password, and a pattern password.

In yet another optional implementation, when determining that the facial recognition fails in verification, the payment terminal may further perform the following step: performing identity authentication in the second manner.

In yet another optional implementation, the first plane may include at least one of planes that form any included angle with a horizontal plane.

According to a third aspect, an embodiment of this application provides a facial recognition-based payment apparatus. The apparatus specifically includes: an execution module, configured to obtain placement posture information of the payment apparatus when detecting a payment event, where the placement posture information is used to determine a tilt angle of a terminal relative to a first plane. The execution module is further configured to: perform facial recognition on a user when determining that the tilt angle meets a preset range; and when the facial recognition succeeds, perform a payment operation corresponding to the payment event.

In this solution, in the method provided in this embodiment of the present invention, a best time point is determined based on an actual status (for example, placement posture information, or even APP information and a purpose of the preset event) of a mobile phone in a preset event (for example, entering an NFC radio-frequency field or identifying a graphic code), to trigger a facial recognition processing unit. Regardless of whether the graphic code is being identified or the mobile phone is picked up after the graphic code is identified, or whether a terminal is approaching a POS machine or the terminal is picked up when the terminal leaves the POS machine, a facial recognition technology that the user does not perceive and has relatively good experience can be used to verify a user identity to a relatively large extent and relatively efficiently.

In an optional implementation, the "payment event" may include: entering a near field communication NFC radio-frequency field; or using a first application or a second application in the first application; or requiring user identity authentication by the used first application or the used second application in the first application.

In another optional implementation, the "payment apparatus" may further include a storage module. The payment apparatus determines that there is no stored face image information in the storage module, where the stored face image information is face image information that is stored in the payment apparatus when the payment apparatus leaves the radio-frequency field in a first preset time period before the payment apparatus detects the payment event.

In still another optional implementation, the "payment event" may further include: identifying a graphic code; or identifying the graphic code, and determining that the graphic code includes payment collection information or payment information, where the graphic code includes at least one of a two-dimensional code and a bar code.

In yet another optional implementation, a third application in the storage module invokes an identification function on the terminal to identify the graphic code, where the third application is an application that is included in a whitelist of the storage module and that has a payment function.

In yet another optional implementation, the execution module adjusts a tilt angle of a photographing apparatus in the payment apparatus relative to the first plane based on the obtained placement posture information of the payment apparatus, until the tilt angle meets the preset range.

In yet another optional implementation, the "execution module" may specifically be configured to: obtain a first image when determining that the tilt angle meets the preset range; and match the first image with a pre-recorded face image template.

In yet another optional implementation, the "execution module" may specifically be configured to: obtain a first image when determining that the tilt angle meets the preset range; and send the first image to a server, so that the server matches the first image with a pre-recorded face image template in the server. In yet another optional implementation, when determining that the tilt angle does not meet the preset range, the execution module performs identity authentication in a second manner. The second manner may include at least one of fingerprint recognition, iris recognition, voiceprint recognition, a digit password, and a pattern password.

In yet another optional implementation, when determining that the facial recognition fails in verification, the execution module performs identity authentication in the second manner.

In yet another optional implementation, the first plane may include at least one of planes that have any included angle with a horizontal plane.

According to a fourth aspect, an embodiment of this application provides a computer-readable storage medium, including an instruction. When the instruction runs on a computer, the computer is enabled to perform the method according to any implementation of the first aspect.

According to a fifth aspect, an embodiment of this application provides a computer program product including an instruction. When the instruction runs on a computer, the computer is enabled to perform the method according to any implementation of the first aspect.

DESCRIPTION OF EMBODIMENTS

To facilitate understanding of the embodiments present invention, the following further describes specific embodiments with reference to the accompanying drawings. The embodiments are not intended to limit the embodiments of the present invention.

According to a facial recognition-based payment method, apparatus, and terminal that are provided in the embodiments of the present invention, the following operations are performed: obtaining placement posture information of the terminal when the terminal detects a payment event, where the placement posture information is used to determine a tilt angle of the terminal relative to a first plane; performing facial recognition on a user when determining that the tilt angle meets a preset range; and when the facial recognition succeeds, performing, by the terminal, a payment operation corresponding to the payment event. In this way, identity authentication required in a payment process can be seamlessly and naturally completed without proactive perception or operation by a user. This can avoid problems of complex operation steps, low efficiency, and low user experience in an existing verification method during payment.

Figure 1:
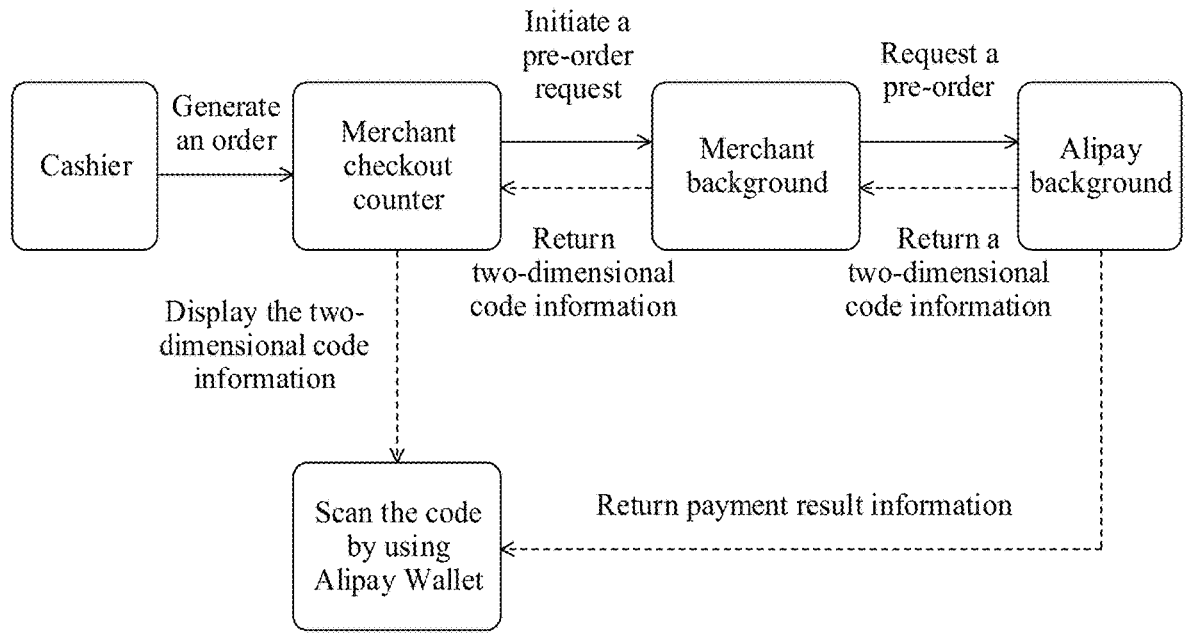
FIG. 1 is a schematic flowchart of a mobile payment manner in which a merchant provides a receipt code and a user scans the receipt code for payment.
Figure 2:
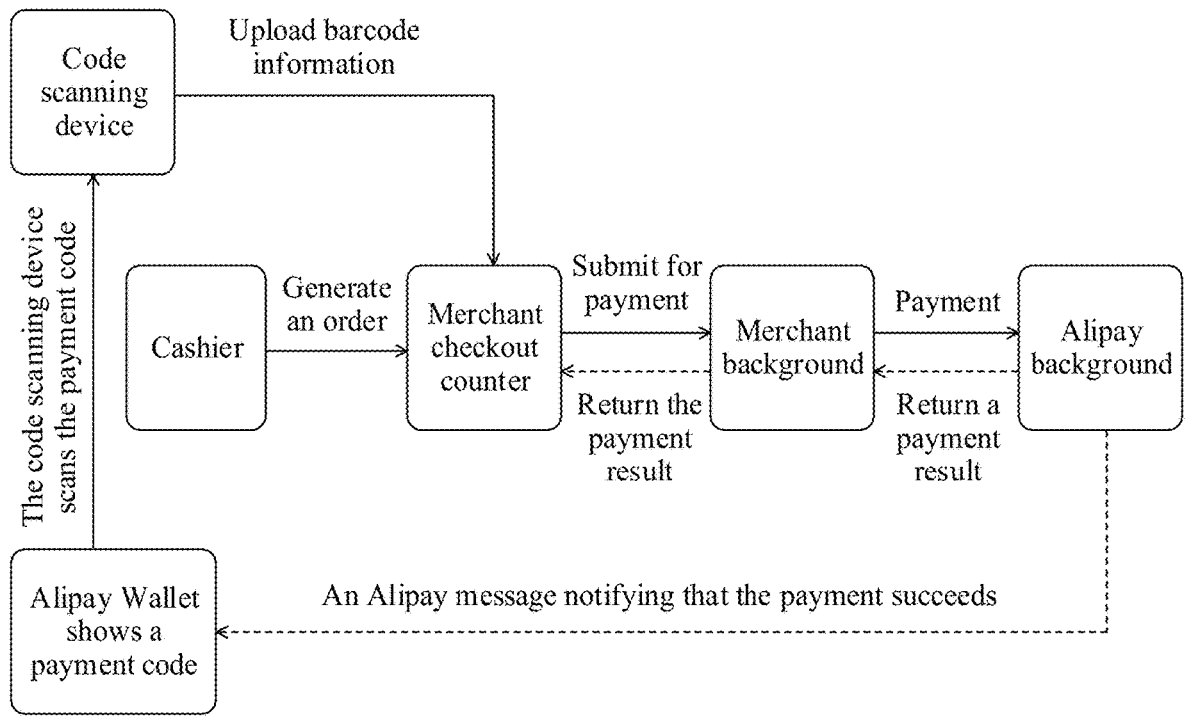
FIG. 2 is a schematic flowchart of a mobile payment manner in which a user provides a payment code and a merchant scans the payment code for payment collection.
Figure 3A:
FIG. 3a is a schematic diagram of a terminal page for prompting a user to manually enter a password in an NFC case.
Figure 3B:
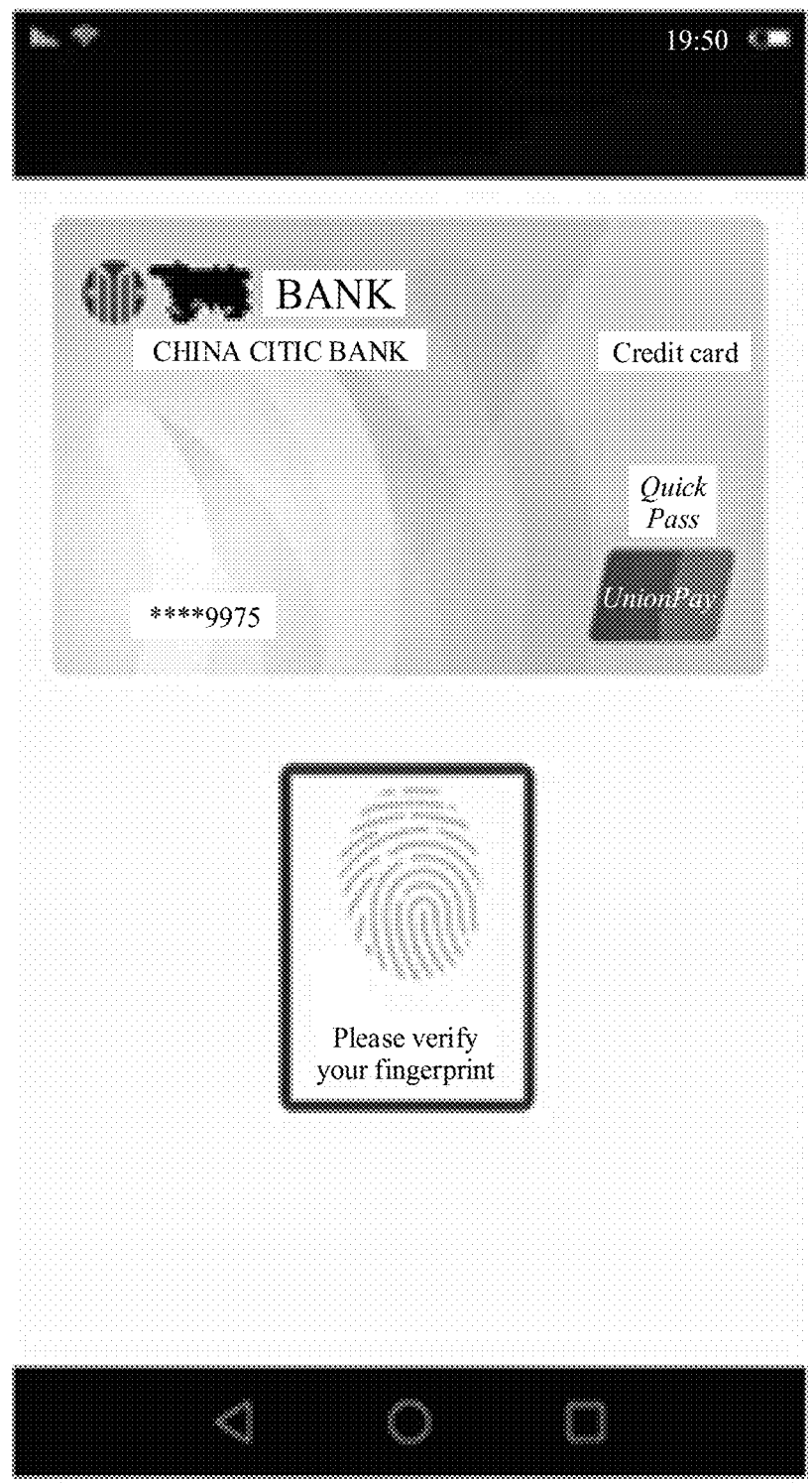
FIG. 3b is a schematic diagram of a terminal page for prompting a user to perform fingerprint authentication in an NFC case.
Figure 4A:
FIG. 4a is a schematic diagram of a payment page applied to facial recognition.
Figure 4B:
FIG. 4b is a schematic diagram of another payment page applied to facial recognition.
Figure 4C:
FIG. 4c is a schematic diagram of still another payment page applied to facial recognition.
Figure 5:
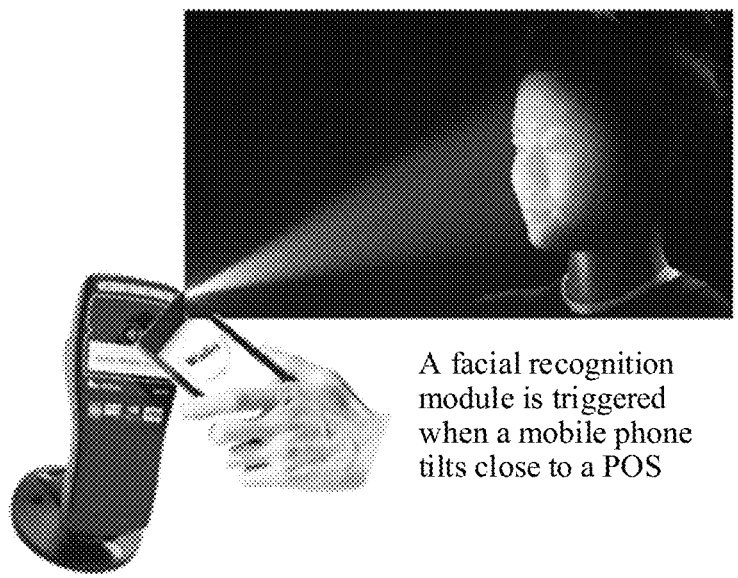
FIG. 5 is a schematic diagram of an application scenario in which a terminal performs payment by approaching a point of sale terminal according to an embodiment of this application.
Figure 6:
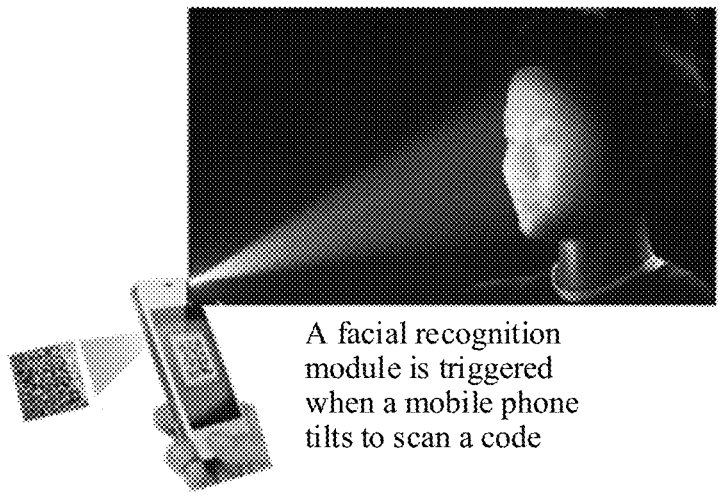
FIG. 6 is a schematic diagram of an application scenario in which a terminal performs payment by scanning a code according to an embodiment of this application.

FIG. 5 and FIG. 6 show application scenarios to which a face recognition-based payment method is applicable according to embodiments of this application. It should be noted that FIG. 5 is a schematic diagram of an application scenario in which a terminal performs payment by approaching a point of sale terminal (referred to as an NFC payment scenario below), and FIG. 6 is a schematic diagram of an application scenario in which a terminal performs payment by scanning a code (referred to as a code scanning payment scenario below). The method provided in the embodiments of this application is not limited to the two application scenarios, but is described in detail only by using the two manners as examples.

FIG. 5 is a schematic diagram of an application scenario in which a terminal performs payment by approaching a point of sale terminal according to an embodiment of this application. As shown in FIG. 5, when performing mobile payment, a user puts the terminal close to the point of sale (point of sale, POS) terminal. When detecting that the terminal enters a sensing area of a POS machine, in other words, when detecting a near field communication NFC radio-frequency field, the terminal obtains placement posture information of the terminal, where the placement posture information is used to determine a tilt angle of the terminal relative to a first plane. The terminal compares the obtained placement posture information with a preset range, and when the placement posture information meets the preset range, the terminal performs facial recognition on the user. When determining that the facial recognition succeeds, the terminal performs subsequent operations of the payment, to complete the payment.

The first plane may be a plane that forms any angle with a horizontal plane. For example, the first plane may be preset as a plane parallel to or perpendicular to the ground, or certainly may be another plane that forms any angle with the ground. For ease of description, a horizontal plane is used as an example in the present invention. A preset range needs to be determined in advance to determine whether the tilt angle (for example, an included angle between a plane on which the terminal is located and the first plane) of the terminal relative to the first plane meets the preset range. For example:

if the first plane is preset as a plane parallel to the horizontal plane, it may be considered that a requirement is met if the included angle between the plane on which the terminal is located (a plane on which a front-facing camera is located) and the first plane is between 10 degrees and 70 degrees; or if the first plane is preset as a plane that forms an included angle of 45 degrees with the horizontal plane, it may be considered that a requirement is met if the included angle between the plane on which the terminal is located and the first plane is less than 5 degrees.

Certainly, the angle range may be fixed, or may be dynamically changeable. For example, affected by a height of the terminal, when the height of the terminal is x (for example, 1 meter or less), the angle range is a-b (for example, 10-70 degrees), and when the height is y (for example, 1.4 meters or higher), the angle range is c-d (for example, 20-85 degrees). The height may be determined by using a sensor and the like in the terminal, and correspondingly a value such as x or y may be fixed, or may be estimated based on information of a terminal user (for example, the user has entered a height of the user or other related information on the terminal).

In addition, for the step of obtaining the placement posture information of the terminal, considering that there are many types of sensing areas of bank POS machines in the market, specifically including sensing areas placed horizontally, in a tilting manner, and vertically, whether a facial recognition manner is suitable needs to be determined by obtaining current placement posture information of the terminal. Specifically, a placement posture of a mobile phone may be an absolute position (namely, a position relative to the earth) of the mobile phone. A placement posture of the terminal can be determined in many manners. For example, a horizontal position or a vertical position is used as a reference position, and an angle of a current position of the mobile phone relative to the reference position is calculated by using a sensor such as a mobile phone gyroscope, to determine whether the angle is within a preset angle range. This is not described in detail or limited in this embodiment of the present invention. Certainly, the placement posture of the mobile phone may also be a position relative to the user. For example, the mobile phone detects a position (specifically, a face position) of the user by using another sensor or another external device, and calculates a relative angle of the mobile phone by using the position as a reference position. This is not limited in this embodiment of the present invention.

When the placement posture information does not meet the preset range, the terminal may automatically trigger a first verification processing unit to perform verification in a second manner (it should be noted that a first manner is a facial recognition manner by default). The first verification processing unit may include at least one of a fingerprint recognition unit, an iris recognition unit, a voiceprint recognition unit, a digit password recognition unit, and a pattern password recognition unit. The second manner may include at least one of fingerprint recognition, iris recognition, voiceprint recognition, a digit password, and a pattern password. The terminal may also display a plurality of manners in the second manner for the user to make a selection. The terminal may further use at least one of a voice notification, a vibration notification, or a text notification, to notify the user to make a selection based on options of the plurality of manners in the second manner displayed by the terminal.

FIG. 6 is a schematic diagram of an application scenario in which a terminal performs payment by scanning a code according to an embodiment of this application. As shown in FIG. 6, when a user performs mobile payment, a terminal invokes a camera (for example, a rear-facing camera) in the terminal to identify a graphic code (namely, a two-dimensional code or a bar code, for example, a two-dimensional code in FIG. 6), to obtain placement posture information of the terminal. Alternatively, when the terminal invokes a camera (for example, a rear-facing camera) in the terminal to identify a graphic code (namely, a two-dimensional code or a bar code), and determines that the identified graphic code includes payment collection information or payment information, the terminal obtains placement posture information of the terminal, where the placement posture information is used to determine a tilt angle of the terminal relative to a first plane (for example, a horizontal plane). The terminal compares the obtained placement posture information with a preset range, and when the placement posture information meets the preset range, the terminal performs facial recognition on the user. When determining that the facial recognition succeeds, the terminal performs subsequent operations of the payment, to complete the payment. When the placement posture information does not meet the preset range, the terminal may automatically trigger a first verification processing unit to perform verification in a second manner. The first verification processing unit may include at least one of a fingerprint recognition unit, an iris recognition unit, a voiceprint recognition unit, a digit password recognition unit, and a pattern password recognition unit. The second manner may include at least one of fingerprint recognition, iris recognition, voiceprint recognition, a digit password, and a pattern password. The terminal may also display a plurality of manners in the second manner for the user to make a selection. The terminal may further use at least one of a voice notification, a vibration notification, or a text notification, to notify the user to make a selection based on options of the plurality of manners in the second manner displayed by the terminal.

In the embodiments shown in FIG. 5 and FIG. 6, the terminal determines, based on a current actual status (in other words, a placement posture of the terminal in NFC payment or code scanning payment), whether it is convenient to use a facial recognition manner (in other words, trigger a facial recognition processing unit) to verify a user identity, and with a facial recognition technology, the terminal can complete an identity authentication operation more naturally and seamlessly. This reduces active input actions of the user, better enhances user experience, and improves identity authentication efficiency during payment.

Figure 7:
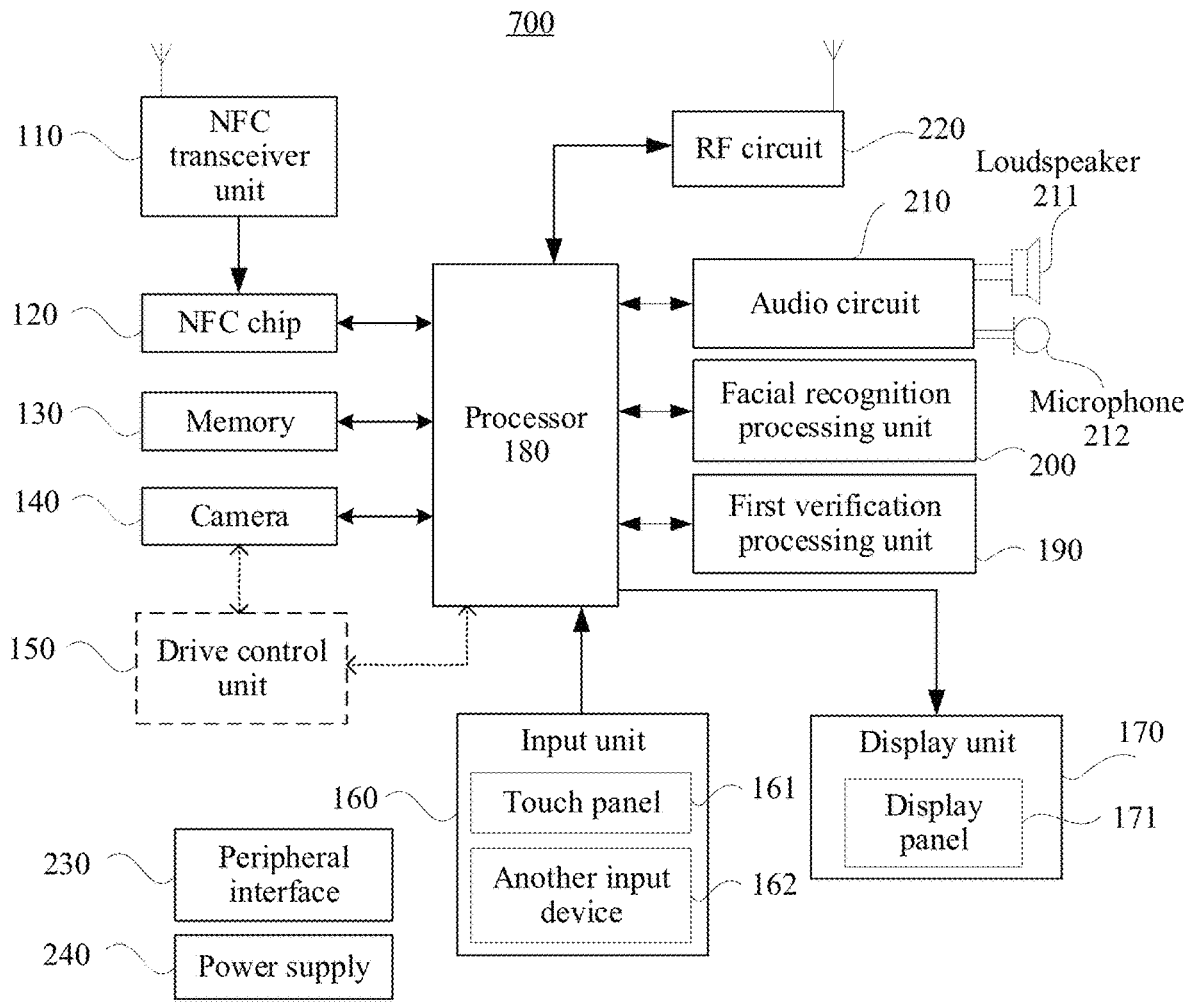
FIG. 7 is a schematic diagram of a structure of a terminal according to an embodiment of this application.

It should be noted that the terminal in the embodiments of the present invention includes but is not limited to a device such as a mobile phone, a smart watch, a smart band, or a smart wrist strap. For ease of description, an example in which the terminal provided in the embodiments of this application is a mobile phone is used for description. FIG. 7 is a schematic diagram of a structure of a terminal according to an embodiment of this application.

FIG. 7 shows a block diagram of a partial structure of a mobile phone 700. The mobile phone 700 includes: an NFC transceiver unit 110, an NFC chip 120, a memory 130, a camera 140, a drive control unit 150, an input unit 160, a display unit 170, a first verification processing unit 180, a facial recognition processing unit 190, an audio circuit 200, and an RF (radio frequency) circuit 210, a peripheral interface 220, and a power supply 230. A person skilled in the art may understand that the structure of the mobile phone shown in FIG. 7 does not constitute a limitation on the mobile phone, and the mobile phone may include more or fewer components than those shown in the figure, or combine some components, or have a different component arrangement.

The following describes each component of the mobile phone 700 in detail:

The NFC transceiver unit 110 may be configured to detect an NFC radio-frequency field and perform NFC communication with a peer device (for example, a POS machine). Optionally, the NFC transceiver unit 110 may include one or more NFC units. The NFC transceiver unit 110 may integrate the NFC chip 120 and the NFC antenna. It may be understood that the NFC chip 120 may not be integrated into the NFC transceiver unit 110.

The memory 130 may be configured to store a software program and a module. Generally, the memory 130 includes but is not limited to an operating system (operating system, OS), a communications module, a contact/motion module, a graphics module, a text output module, an application (Application, APP), a content capturing module, a camera module, a surface flinger module (surface flinger module), a buffer module (buffer module), a touch module (touch module), a Bluetooth module, and the like. In addition, the memory 130 may mainly include a program storage area and a data storage area. The program storage area may store an operating system, an application required by at least one function (such as an audio playing function or an image playing function), and the like. The data storage area may store data (such as audio data or a phonebook) created according to use of the mobile phone 700, and the like. The memory 130 may further include a high-speed random access memory, or may include a non-volatile memory such as at least one disk storage device, a flash memory device, or another volatile solid-state storage device. In addition, the contact/motion module included in the memory 130 is configured to: detect contact between an object or a finger and a touch panel 161 or a click touch wheel, capture a speed (a direction and a value) and an acceleration (a value or direction change) of the contact, and determine a type of a contact event. For example, there are a plurality of contact event detection modules: a calculation module (figure-down module or figure-up module), a figure-dragging module (figure-dragging module), and a figure-tap module (figure-tap module). Sometimes, gestures are combined with elements in a UI interface to implement some operations: finger pinching/depinching (finger pinching/depinching), and the like.

The Bluetooth module is configured to connect to an external device. The external device performs an operation on the mobile phone by using the Bluetooth module, and the external device includes a device, such as a Bluetooth handle, that can remotely control the mobile phone.

The graphics module is configured to render and display graphics on a touchscreen or another display. The graphics include web pages, icons, digital images, videos, and animations.

The application may include contacts, a phone, a video conference, an email client, instant messaging, personal motion, a camera, image management, a video player, a music player, a calendar, a plug-in (weather, stock, a calculator, a clock, and a dictionary), a customized plug-in, searching, a note, a map, an online video, and the like. The application described herein may include an application preset before delivery of the mobile phone, and may also include a third-party application (compared with the application preset on the mobile phone) downloaded and installed by the user from an application market.

The camera 140 may include at least one of a front-facing camera and a rear-facing camera, and may be configured to photograph an entity such as a person or an object. In this embodiment of the present invention, the camera 140 may be used to identify a graphic code, capture a face image, and the like.

The drive control unit 150 may be configured to control movement (for example, rotation) of the movable camera 140.

The input unit 160 may be configured to: receive entered digit or character information, and generate key signal input related to user settings and function control of the mobile phone 700. The input unit 160 may include a touch panel 161 and another input device 162. The touch panel 161 is also referred to as a touchscreen, and can collect a touch operation (for example, an operation performed by a user on the touch panel 161 or near the touch panel 161 by using any suitable object or accessory such as a finger or a stylus) performed by the user on or near the touch panel 161, and drive a corresponding connection apparatus according to a preset program. In addition, the touch panel 161 may further include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into coordinates of a touch point, then sends the information to the processor 180, and receives and executes a command sent by the processor 180. Specifically, the touch panel 161 may be implemented in various types, such as a resistive type, a capacitive type, an infrared type, and a surface acoustic wave type. In addition to the touch panel 161, the input unit 160 may further include the another input device 162. The another input device 162 may include but be not limited to one or more of a physical keyboard, a function key (such as a volume control key or an on/off key), a tracking ball, a mouse, a control lever, a Bluetooth controller or the like.

The display unit 170 may be configured to display information entered by the user or information provided for the user, and various menus of the mobile phone 700. The display unit 170 may include a display panel 171. The display panel 171 may be configured in a form of a liquid crystal display (liquid crystal display, LCD), an organic light-emitting diode (organic light-emitting diode, OLED), or the like. Further, the touch panel 161 may cover the display panel 171. After detecting the touch operation on or near the touch panel 161, the touch panel 161 transmits the touch operation to the processor 180 to determine a type of a touch event, and then the processor 180 provides a corresponding visual output on the display panel 171 based on the type of the touch event. In FIG. 7, the touch panel 161 and the display panel 171 act as two independent components to implement input and output functions of the mobile phone 700. However, in some embodiments, the touch panel 161 and the display panel 171 may be integrated to implement the input and output functions of the mobile phone 700.

By running the software program and the module stored in the memory 130, the processor 180 executes various function applications and data processing of the mobile phone 700. The processor 180 is a control center of the mobile phone 700, and is connected to all parts of the mobile phone by using various interfaces and lines. By running or executing the software program and/or the module stored in the memory 130, and invoking data stored in the memory 130, the processor 180 performs various functions and data processing of the mobile phone 700, to perform overall monitoring on the mobile phone. Optionally, the processor 180 may include one or more processing units. The processor 180 may integrate an application processor and a modem processor. The application processor mainly processes an operating system, a user interface, an application, and the like. The modem processor mainly processes wireless communication. It may be understood that the modem processor may not be integrated into the processor 180.

The first verification processing unit 190 may include at least one of a fingerprint recognition unit, an iris recognition unit, a voiceprint recognition unit, a digit password recognition unit, and a pattern password recognition unit, configured to match at least one of received fingerprint information, iris information, voiceprint information, digit information, and pattern information with associated information stored in the memory 130, to determine whether the received information matches at least one of a fingerprint template, an iris template, a voiceprint template, a digit template, and a pattern template that are pre-stored in the memory 130.

The facial recognition processing unit 200 may be configured to process a first image collected by using the camera 140, and determine whether the first image matches a face image template pre-stored in the memory 130. It should be noted that the facial recognition processing unit 200 may include a collector, and the collector is configured to collect a face image and is not shown in the figure. Alternatively, the collector does not need to be integrated into the facial recognition processing unit 200. In other words, the mobile phone 100 may further include a collector, and the collector is configured to collect a face image and is not shown in the figure.

The audio circuit 210, a loudspeaker 211, and a microphone 212 may provide an audio interface between the user and the mobile phone 700. The audio circuit 210 may transmit, to the loudspeaker 211, a received electrical signal converted from audio data, and the loudspeaker 211 converts the electrical signal into a sound signal for output. In another aspect, the microphone 212 converts a collected sound signal into an electrical signal; and the audio circuit 210 receives the electrical signal, converts the electrical signal into audio data, and then outputs the audio data to the RF circuit 220, so that the audio data is sent to, for example, another mobile phone, or the audio data is output to the memory 130 for further processing. In this embodiment, the audio circuit 210 may convert prompt information into audio data to prompt the user.

The RF circuit 220 may be configured to collect information or receive and send a signal during a call. The RF circuit 220 receives downlink information of a base station, and sends the downlink information of the base station to the processor 180, and the server processes the downlink information. In addition, the RF circuit 220 may further send uplink-related data to the base station. The RF circuit usually includes but is not limited to an antenna, at least one amplifier, a signal collector, a coupler, a low noise amplifier (low noise amplifier, LNA), a duplexer, and the like. In addition, the RF circuit 220 may further communicate with a network and/or another device through wireless communication. The wireless communication may use any communication standard or protocol, including but not limited to a global system for mobile communications (global system of mobile communication, GSM), a general packet radio service (general packet radio service, GPRS), code division multiple access (code division multiple access, CDMA), wideband code division multiple access (wideband code division multiple access, WCDMA), long term evolution (long term evolution, LTE), an email, a short messaging service (short message service, SMS), and the like.

In addition, the mobile phone 700 may further include at least one sensor, such as a light sensor, a motion sensor, and another sensor. Specifically, the light sensor may include an ambient light sensor and a proximity sensor. The ambient light sensor may adjust luminance of the display panel 171 based on brightness of ambient light, and when the mobile phone 700 approaches an ear, the proximity sensor may turn off the display panel 171 and/or backlight. As a type of motion sensor, an accelerometer sensor may detect a value of an acceleration in each direction (generally, three axes), may detect a value and a direction of gravity in a static state, and may be used in an application for identifying a mobile phone posture (such as screen switching between a landscape mode and a portrait mode, a related game, or magnetometer posture calibration), a function related to vibration identification (such as a pedometer or a knock), and the like. Other sensors such as a gyroscope, a barometer, a hygrometer, a thermometer, and an infrared sensor may be further disposed in the mobile phone 700. Details are not described herein.

A wireless fidelity (wireless fidelity, Wi-Fi) transmission technology is a short-distance wireless transmission technology. The mobile phone 700 may help, by using a Wi-Fi module, the user collect an email, browse a web page, access streaming media, and the like. The WI-FI transmission technology provides wireless broadband internet access for the user. FIG. 7 does not show the Wi-Fi module. However, it can be understood that the Wi-Fi module is not a mandatory component of the mobile phone 700, and may be omitted as required without changing the essence of the present invention.

The mobile phone 100 further includes the power supply 240 (such as a battery) that supplies power to each component. The power supply 240 may be logically connected to the processor 180 by using a power management system, to implement functions such as charge management, discharge management, and power consumption management by using the power management system.

Figure 8:
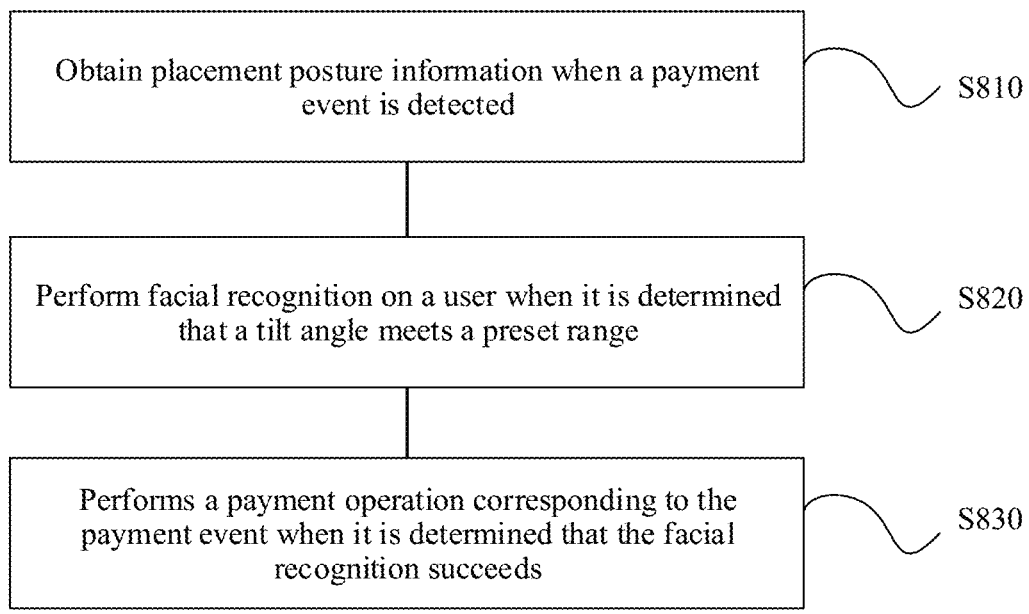
FIG. 8 is a schematic flowchart of a facial recognition-based payment method according to an embodiment of this application.

FIG. 8 is a schematic flowchart of a facial recognition-based payment method according to an embodiment of this application. As shown in FIG. 8, the verification method may specifically include the following steps S810 to S830:

S810: Obtain placement posture information of a terminal when the terminal detects a payment event, where the placement posture information is used to determine a tilt angle of the terminal relative to a first plane.

Specifically, in a possible implementation, the terminal obtains the placement posture information when the terminal detects at least one of the following cases: the terminal enters a near field communication NFC radio-frequency field; the terminal determines to use a first application on the terminal or a second application in the first application; and the terminal determines whether the used first application on the terminal or the second application in the first application requires user identity authentication.

It should be noted that the first application described herein is usually an electronic wallet application such as a Huawei wallet, and may be set as a default NFC application on the terminal (in other words, the terminal uses the first application by default after detecting the NFC radio-frequency field). The second application may be a bank card application bound to the electronic wallet application, or the like, or may be set as a default NFC application in the first application (namely, when using the first application, the terminal preferentially uses the second application to complete payment by default). The foregoing two cases, namely a case in which the terminal determines to use the first application on the terminal or the second application in the first application, and a case in which the terminal determines whether the used first application on the terminal or the used second application in the first application requires user identity authentication, imply that the terminal has entered the NFC radio-frequency field. A specific implementation is as follows: After detecting that the terminal enters the NFC radio-frequency field, the terminal determines whether a default NFC application on the terminal is the first application or the second application in the first application, and if yes, the terminal determines to use the first application or the second application in the first application, that is, this is the first one of the foregoing two cases. Further, if it is determined to use the first application or the second application in the first application, the terminal determines whether the first application or the second application requires user identity authentication, and if yes, it is determined that the used first application on the terminal or the second application in the first application requires user identity authentication, that is, this is the latter one of the foregoing two cases.

In another possible implementation, when detecting that the terminal identifies a graphic code, the terminal obtains the placement posture information of the terminal; or when detecting that the terminal identifies a graphic code, and determining that the graphic code includes payment collection information or payment information, the terminal obtains the placement posture information of the terminal. The graphic code includes at least one of a two-dimensional code and a bar code.

Specifically, the terminal screens and finds a third application based on a whitelist of the terminal. The third application on the terminal invokes an identification function on the terminal to identify the graphic code. An application in the whitelist has a payment function. The whitelist may be generated by the terminal by default or may be generated according to a user setting. This step is applicable to all the embodiments.

In addition, in addition to the foregoing two possible implementations, when the terminal detects the payment event, there may be another possible implementation: when detecting that a graphic code is displayed for identification by another device, or when detecting that a graphic code is displayed and determining that the displayed graphic code includes payment collection information or payment information (for example, a two-dimensional code or a bar code for payment collection or payment is provided for scanning by the other party), the terminal obtains the placement posture information of the terminal.

It should be noted that the placement posture information may be specifically used to determine a tilt angle of a component (for example, a camera) on the terminal relative to the first plane, or may be understood as parameter information required to determine a tilt angle of the terminal or a component (for example, a camera) on the terminal relative to the first plane.

The first plane may be a plane that forms any angle with a horizontal plane. For example, the first plane may be preset as a plane parallel to or perpendicular to the ground, or certainly may be another plane that forms any angle with the ground. For ease of description, a horizontal plane is used as an example in the present invention. A preset range needs to be determined in advance to determine whether the tilt angle (for example, an included angle between a plane on which the terminal is located and the first plane) of the terminal relative to the first plane meets the preset range. For example:

if the first plane is preset as a plane parallel to the horizontal plane, it may be considered that a requirement is met if the included angle between the plane on which the terminal is located (a plane on which a front-facing camera is located) and the first plane is between 10 degrees and 70 degrees; or if the first plane is preset as a plane that forms an included angle of 45 degrees with the horizontal plane, it may be considered that a requirement is met if the included angle between the plane on which the terminal is located and the first plane is less than 5 degrees.

Certainly, the angle range may be fixed, or may be dynamically changeable. For example, affected by a height of the terminal, when the height of the terminal is x (for example, 1 meter or less), the angle range is a-b (for example, 10-70 degrees), and when the height is y (for example, 1.4 meters or higher), the angle range is c-d (for example, 20-85 degrees). The height may be determined by using a sensor and the like in the terminal, and correspondingly a value such as x or y may be fixed, or may be estimated based on information of a terminal user (for example, the user has entered a height of the user or other related information on the terminal).

In addition, for the step of obtaining the placement posture information of the terminal, considering that there are many types of sensing areas of bank POS machines in the market, specifically including sensing areas placed horizontally, in a tilting manner, and vertically, whether a facial recognition manner is suitable needs to be determined by obtaining current placement posture information of the terminal. Specifically, a placement posture of a mobile phone may be an absolute position (namely, a position relative to the earth) of the mobile phone. A placement posture of the terminal can be determined in many manners. For example, a horizontal position or a vertical position is used as a reference position, and an angle of a current position of the mobile phone relative to the reference position is calculated by using a sensor such as a mobile phone gyroscope, to determine whether the angle is within a preset angle range. This is not described in detail or limited in this embodiment of the present invention. Certainly, the placement posture of the mobile phone may also be a position relative to the user. For example, the mobile phone detects a position (specifically, a face position) of the user by using another sensor or another external device, and calculates a relative angle of the mobile phone by using the position as a reference position. This is not limited in this embodiment of the present invention.

S820: The terminal performs facial recognition on the user when determining that the tilt angle meets the preset range.

Specifically, when the terminal determines that the tilt angle meets the preset range, the terminal obtains a first image; and the terminal matches the first image with a pre-recorded face image template in the terminal, and determines a matching result. Alternatively, when the terminal determines that the tilt angle meets the preset range, the terminal obtains a first image; and the terminal sends the first image to a server, so that the server matches the first image with a pre-recorded face image template in the server, and determines a matching result.

In an NFC payment scenario, an electronic wallet needs to be designed to meet a requirement of approaching a POS machine twice. Therefore, in a technical solution, it needs to consider associating two consecutive operations of approaching the POS machine by presetting a time interval (for example, if the time interval between two operations of approaching the POS machine is less than a preset time interval, it is considered that two consecutive actions of approaching the POS machine are performed to complete a same payment, otherwise, it is considered that the two actions of approaching the POS machine are not associated), and it also needs to consider using a result of an operation between the operations of approaching the POS machine (namely, an operation performed in a time period of leaving the POS machine between the two operations of approaching the POS machine, for example, a facial recognition operation) in a process of approaching the POS machine for the second time for payment. In this case, in the scenario of the possible implementation recorded in S810, before the step of performing facial recognition on the user when the terminal determines that the tilt angle meets the preset range, the method further includes: determining, by the terminal, that there is no stored face image information on the terminal. The stored face image information includes at least one of a face image collected within a first preset time period when the terminal last detects, before a current moment, that the terminal leaves the NFC radio-frequency field and a recognition result of the collected face image, where the current moment is a moment at which the terminal determines that there is no stored face image information on the terminal.

Before the step of determining, by the terminal, that there is no stored face image information on the terminal, the method may further include: determining, by the terminal, that a time interval between a first moment and a second moment is less than or equal to a second preset time period. The first moment is a moment at which the terminal detects that the terminal enters the NFC radio-frequency field, and the second moment is a moment at which the terminal detects last time before the first moment that the terminal leaves or enters the NFC radio-frequency field.

Figure 9:
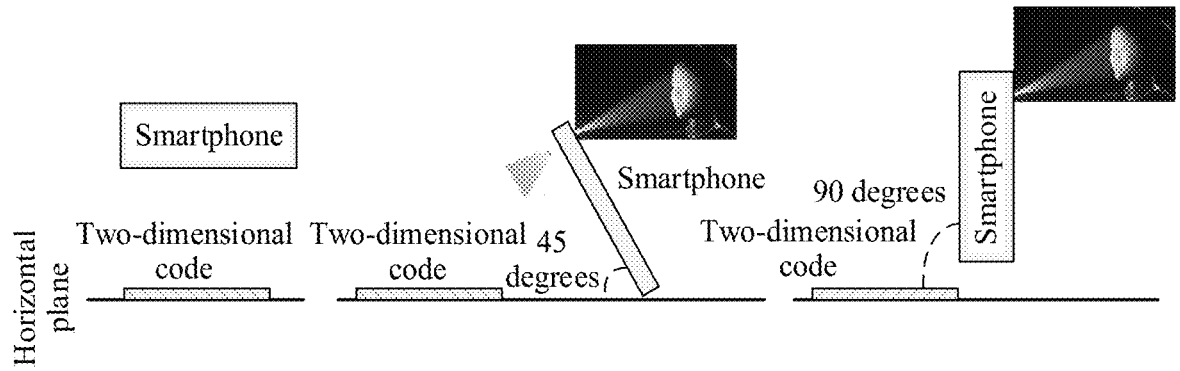
FIG. 9 is a schematic diagram of an angle at which a terminal identifies a graphic code according to an embodiment of this application.

In the scenario of the another possible implementation recorded in S810, when an operation instruction for instructing the terminal to identify the graphic code is used, assuming that the terminal detects that the user invokes a camera when enabling a scanning function, and when it is determined that a current placement posture of the terminal does not meet the preset range (for example, as shown in the leftmost in FIG. 9, a two-dimensional code in a store is placed parallel to a horizontal plane, and when the user enables the scanning function, the terminal is placed horizontally, which cannot or does not make the terminal easier to obtain a face image), adjustment is performed by using another means. For example, a facial recognition processing unit is triggered within a preset time period (for example, as shown in the middle or the rightmost of FIG. 9, based on the foregoing example, when the user places the terminal vertically or tilts the terminal 45 degrees or 90 degrees relative to the horizontal plane after a moment (within the preset time period), the user performs recognition by aligning the terminal with a two-dimensional code, and triggers the facial recognition processing unit to perform facial recognition, and in this case, the terminal may relatively clearly collect a face image; and for another example, the terminal triggers, within a preset time period after code scanning, the facial recognition processing unit again to perform facial recognition, and in this case, the placement posture of the terminal may be determined again). Alternatively, the user may be prompted, by using at least one of voice and a user interface, to enable the placement posture information of the terminal to meet the preset range, and perform facial recognition again. Alternatively, when the terminal includes a movable camera (for example, the camera may rotate at any angle), the terminal automatically adjusts, based on the obtained placement posture information of the terminal, the camera to adjust the tilt angle of the terminal relative to the first plane to meet the preset range.

It should be noted that when determining that the tilt angle does not meet the preset range, the terminal performs identity authentication in a second manner. The second manner includes at least one of existing fingerprint recognition, iris recognition, voiceprint recognition, a digit password, and a pattern password.

S830: When determining that the facial recognition succeeds, the terminal performs a payment operation corresponding to the payment event.

Specifically, if verification succeeds, the terminal completes, based on the matching result determined in S820, the payment in response to the payment event detected by the terminal.

Specifically, if the matching succeeds, the terminal sends a payment request to a payment server. Alternatively, if this operation is performed after the terminal receives a payment confirmation sent by the payment server, the terminal sends payment confirmation information to the payment server after the matching succeeds. Alternatively, if the matching succeeds, a payment password that is securely pre-stored is locally obtained from the terminal, and then the payment password is sent to the payment server for verification. The payment server herein may be a server corresponding to the first application or a server corresponding to a second application in the first application. The first application herein is usually an electronic wallet application such as Alipay Wallet, WeChat Payment, or Huawei Wallet, and the second application may be a bank card application bound to the electronic wallet application.

When determining that the facial recognition fails in verification, the terminal performs identity authentication in a second manner. The second manner includes at least one of fingerprint recognition, iris recognition, voiceprint recognition, a digit password, and a pattern password. Alternatively, the terminal prompts the user to perform identity authentication in a second manner. The second manner includes at least one of fingerprint recognition, iris recognition, voiceprint recognition, a digit password, and a pattern password. Alternatively, this procedure directly ends.

In this embodiment of the present invention, two possible embodiments are provided based on S810 and with reference to interaction between modules in the terminal. In a possible implementation, an NFC payment scenario is described in detail with reference to FIG. 10 to FIG. 12B. In another possible implementation, a code scanning payment scenario is described in detail with reference to FIG. 13 and FIG. 14.

Figure 10:
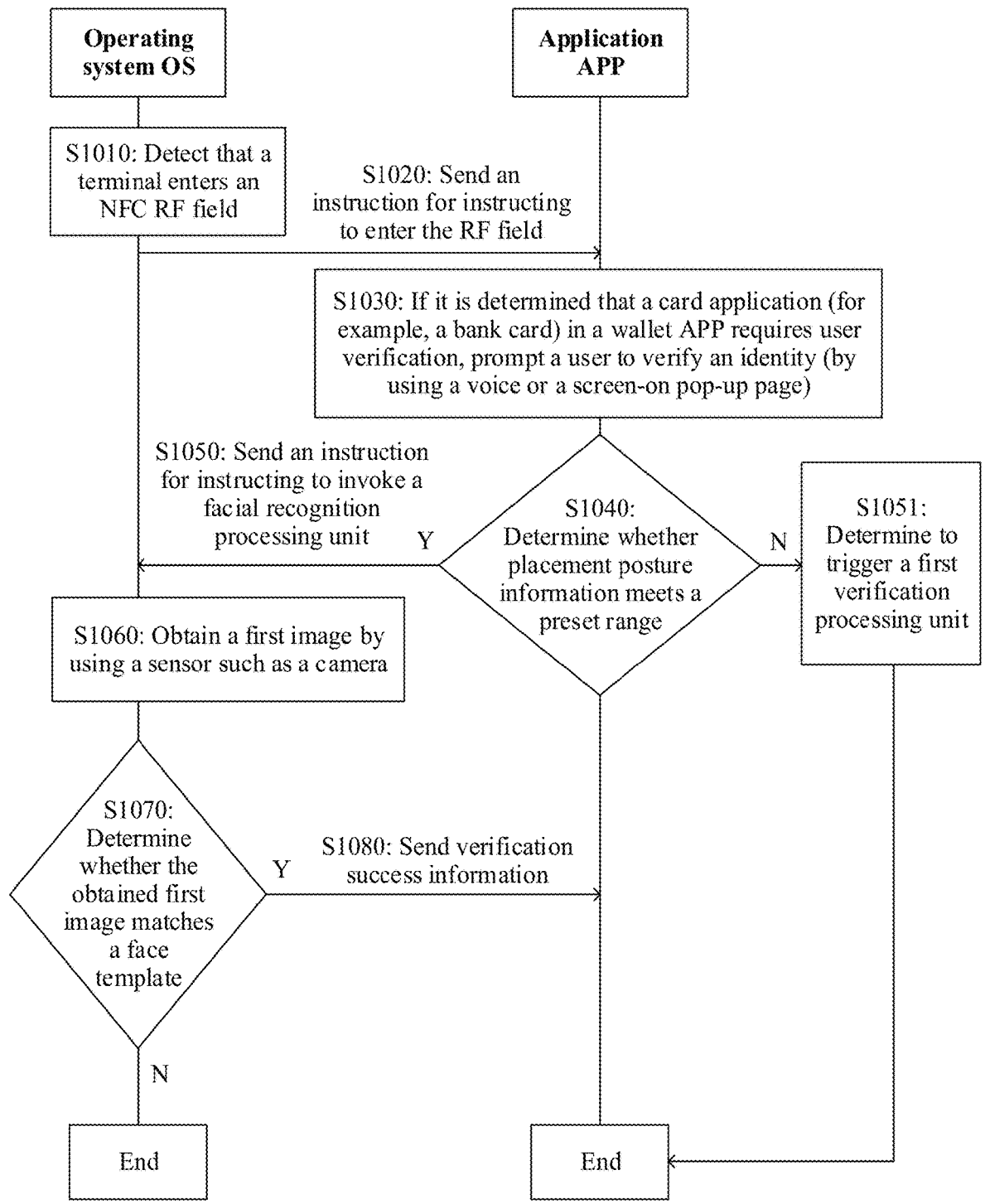
FIG. 10 is a schematic flowchart of a facial recognition-based payment method for near field communication in an NFC payment scenario according to an embodiment of this application.

FIG. 10 is a schematic flowchart of a facial recognition-based payment method for near field communication in an NFC payment scenario according to an embodiment of this application. As shown in FIG. 10, for ease of description, an example in which an operating system (operating system, OS, such as an Android system or an iOS system) and an application (application, APP) interact with each other between different units in a terminal is used for description. The method provided in this embodiment includes: when it is determined, in a preset manner, that user verification needs to be performed, determining, by the APP, whether placement posture information of the terminal is within a preset range, if the placement posture information is within the preset range, determining to trigger a facial recognition processing unit to obtain a first image (namely, a face image of a user), and if the placement posture information is not within the preset range, determining to trigger a first verification processing unit; and when triggering the facial recognition processing unit, determining, based on a result of matching the first image with a face image template, whether to allow execution of a subsequent payment operation. The first verification processing unit may include at least one of a fingerprint recognition unit, an iris recognition unit, a voiceprint recognition unit, a digit password recognition unit, and a pattern password recognition unit. The preset manner may be at least one of the following cases: the terminal detects that the terminal enters a near field communication NFC radio-frequency field; the terminal determines to use a first application on the terminal or a second application in the first application; and the terminal determines whether the used first application on the terminal or the second application in the first application requires user identity authentication. For example, a mobile phone with an NFC function is used for payment on a POS machine. Specifically, S1010 to S1070 may be included.

S1010: The OS detects that the terminal enters the NFC radio-frequency (radio frequency, RF) field.

Specifically, the OS detects the NFC radio-frequency field by using an NFC chip on the terminal, in other words, after detecting the NFC radio-frequency field, the NFC chip reports, to the OS, a notification message indicating that the NFC radio-frequency field is detected. The detecting the NFC radio-frequency field herein refers to detecting a radio frequency signal based on an NFC technology. For details, refer to standards such as Analog, Digital, and Activity defined by an NFC forum (NFC Forum). Details are not described herein again.

S1020: The OS sends, to the APP, an instruction for instructing the terminal to enter the NFC RF field.

It should be noted that this step is convenient for the OS to invoke the application APP.

S1030: After receiving a notification instruction sent by the OS, the APP obtains current placement posture information of the terminal in response to the instruction.

In the foregoing steps S1020 to S1030, in an implementation, the OS of the terminal determines that a current default NFC application of the system is the application shown in FIG. 10 (for example, the default NFC application is preset in the system or the user may set an electronic wallet application installed on a mobile phone as the default NFC application). Then, the application is invoked (for example, in S1020, the application may be invoked by using a callback function), and a corresponding code logic (namely, the logic described in S1030) is executed in the application. A specific implementation is not limited herein.

In this embodiment of the present invention, after being invoked (or after receiving the notification in the step S1020), the APP may directly determine that user identity authentication is required. Alternatively, when it is continuously determined that a default card application (for example, the default card application is preset in the system, or the user previously sets a card application in the APP as the default card application, or the default card application is a card application selected by the user from the APP this time) in the APP has a security requirement for authenticating a user identity, it is determined that user identity authentication is required. If the APP determines that user identity authentication is required, the APP obtains the placement posture information of the terminal. In addition, the APP may prompt to the user in a manner that includes but is not limited to: a voice prompt, and a text or image prompt provided by using a user interface UI.

S1040: The APP determines whether the obtained current placement posture information of the terminal meets a preset range. The placement posture information is used to determine a tilt angle of the terminal relative to a first plane.

The first plane, the preset range, and the obtaining of the placement posture information of the terminal described herein are similar to those described in the step S810 in the embodiment shown in FIG. 8. Details are not described herein again.

S1050: If the obtained current placement posture information of the terminal meets the preset range, the APP sends, to the OS, an instruction for instructing to invoke the facial recognition processing unit.

It should be noted that a plurality of implementations may be used herein. For example, using an Android system as an example, the facial recognition processing unit may be invoked by using an intent mechanism. This is not limited herein.

S1060: The OS receives the instruction for invoking the facial recognition processing unit, and in response to the instruction, the OS invokes the facial recognition processing unit to obtain the first image.

Specifically, the OS may invoke a camera or another sensor that can obtain a face image, to collect a profile image of the user, and generate a face image (namely, the first image) based on a predetermined algorithm.

S1070: The OS matches the obtained face image with a face image template (namely, a pre-obtained face image) that is pre-stored on the terminal, and determines whether the obtained face image matches the face image template preset in the terminal.

S1080: If the matching succeeds, the OS determines verification success information and sends the verification success information to the APP. If the matching fails, no further operation is required.

In the steps S1060 to S1080, a specific space (for example, a common rich execution environment (rich execution environment, REE), a trusted execution environment (trusted execution environment, TEE), a secure element (secure element, SE), or another dedicated secure environment) in which facial recognition is performed in the terminal, and an algorithm used for facial recognition are not limited in this embodiment of the present invention.

It should be noted that, if the matching fails, after receiving a matching failure result, the APP may further perform verification again by using the first verification processing unit. In addition, the APP may prompt the user at the same time in a manner that includes but is not limited to a voice prompt, and a text or image prompt provided by using a UI.

Optionally, if the instruction sent by the APP in the step S1050 is not limited to an instruction for invoking the facial recognition processing unit, but is an instruction for invoking an identity authentication processing unit (the identity authentication processing unit herein may include the facial recognition processing unit and the first verification processing unit, in other words, it may be understood that the APP is not limited to a specific verification manner), if the matching fails, the OS directly uses the first verification processing unit to perform verification again. Certainly, in this case, the user may also be prompted in a manner similar to that in the foregoing description, and details are not described herein again.

Alternatively, S1051: If the obtained current placement posture information of the terminal does not meet the preset range, determine to trigger the first verification processing unit to complete verification, where the first verification processing unit may include at least one of a fingerprint recognition unit, an iris recognition unit, a voiceprint recognition unit, a digit password recognition unit, and a pattern password recognition unit.

Based on a verification result, if the first verification processing unit succeeds in verification, a payment operation is performed according to an existing procedure. Specifically, if the matching succeeds, the terminal sends a payment request to a payment serving end (for example, a server). Alternatively, if this operation is performed after the terminal receives a payment confirmation sent by the payment serving end, the terminal sends payment confirmation information to the payment serving end after the matching succeeds. Alternatively, if the matching succeeds, a payment password that is securely pre-stored is locally obtained from the terminal, and then the payment password is sent to the payment serving end for verification. If the first verification processing unit fails in verification, the procedure ends.

It should be noted that, a manner of performing the payment operation when the verification succeeds is, for example, allowing the terminal (namely, the mobile phone) to continue to interact with the POS machine, for example, to complete data required for the current payment, which may specifically comply with an existing protocol, for example, at least one of a people's bank of China (the people's bank of China, PBOC) standard and an EMV standard. This is not limited herein.

In addition, it should be noted that S1070 and S1080 may be replaced with the following steps:

The OS sends the obtained face image to the APP.

The APP sends the received face image to a server, and the server matches a face image template pre-stored on the server side with the obtained first image, to determine a matching result. The face image template pre-stored on the server side may be obtained in a manner in which the user submits face image information to the server when registering an account (for example, binding and downloading a bank card application in an electronic wallet), and the server saves the face image information as the face image template.

The server sends the matching result to the APP, and the APP performs determining based on the matching result. If the matching succeeds, a payment operation corresponding to the payment request is executed according to the existing procedure. If the matching fails, the APP may prompt the user to perform verification again by using the first verification processing unit. The prompt manner may include at least one of a voice prompt and a text prompt on an APP interface. The first verification processing unit may include at least one of a fingerprint recognition unit, an iris recognition unit, a voiceprint recognition unit, a digit password recognition unit, and a pattern password recognition unit. Alternatively, the server directly determines, based on the matching result, whether to continue to perform a subsequent payment operation.

Compared with an identity authentication manner in existing mobile payment, the method provided in this embodiment can enable the terminal to determine, based on a current actual status, whether it is convenient to trigger the facial recognition processing unit to verify a user identity, and can use a facial recognition technology with relatively good user experience to verify the user identity to a relatively large extent and relatively efficiently. With the facial recognition technology, an identity authentication operation is completed more naturally and seamlessly. This reduces active input actions of the user, better enhances user experience, and improves identity authentication efficiency during payment.

Figure 11:
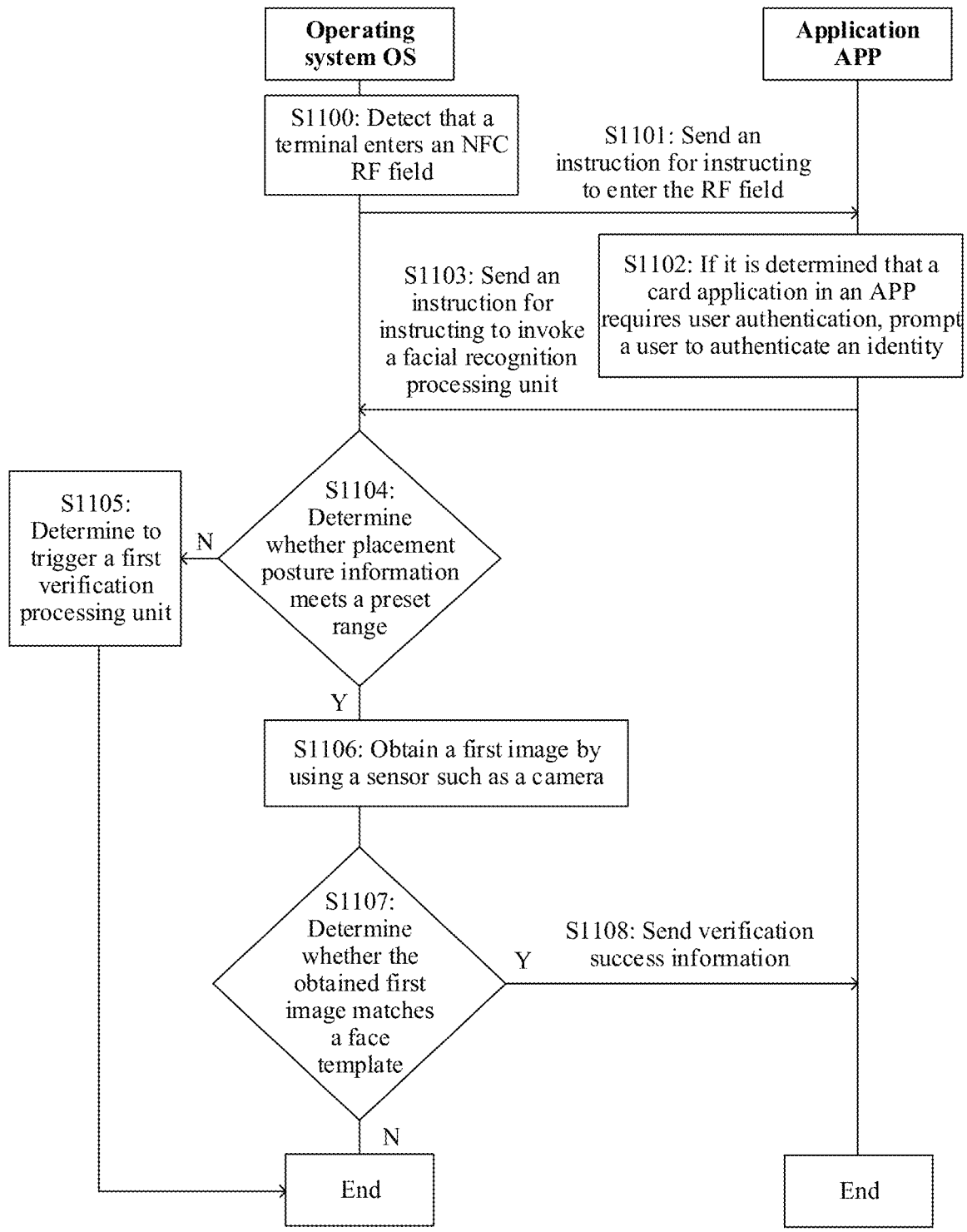
FIG. 11 is a schematic flowchart of another facial recognition-based payment method for near field communication in an NFC payment scenario according to an embodiment of this application.

FIG. 11 is a schematic flowchart of another facial recognition-based payment method for near field communication in an NFC payment scenario according to an embodiment of this application. As shown in FIG. 11, the method provided in this embodiment may include the following steps: when detecting that a terminal enters an NFC RF field and an APP needs to perform user verification, an OS determines whether a placement posture of the terminal is within a preset range, if the placement posture is within the preset range, the OS determines to trigger a facial recognition processing unit to obtain a first image by using a camera and a sensor, and if the placement posture is not within the preset range, the OS determines to trigger a first verification processing unit; and the OS determines a verification result based on the first image and a face image template, and sends the determined verification result to the APP (or performs feedback in response to a request of the APP), so that the APP determines, based on the verification result, whether to allow execution of a subsequent payment operation.

Specifically, S1100 to S1107 may be included.

For S1100 to S1103, refer to the operations performed in S1010 to S1030 in FIG. 10, and details are not described herein again.

S1104: In response to a received instruction for invoking the facial recognition processing unit, the OS determines whether obtained current placement posture information of the terminal meets a preset range. The placement posture information is used to determine a tilt angle of the terminal relative to a first plane.

S1160: If the obtained current placement posture information of the terminal meets the preset range, the OS invokes the facial recognition processing unit, to obtain the first image.

S1170: The OS matches the obtained first image with a face image template (namely, a pre-obtained face image) that is pre-stored on the terminal, and determines whether the obtained face image matches the face image template preset in the terminal.

S1108: If the matching succeeds, the OS determines verification success information and sends the verification success information to the APP. If the matching fails, no further operation is required.

It should be noted that, if the matching fails, the APP may prompt the user to perform verification again by using the first verification processing unit. In addition, the APP may prompt the user at the same time in a manner that includes but is not limited to a voice prompt, and a text or image prompt provided by using a UI.

Alternatively, S1105: If the obtained current placement posture information of the terminal does not meet the preset range, determine to trigger the first verification processing unit to complete verification. The first verification processing unit may include at least one of a fingerprint recognition unit, an iris recognition unit, a voiceprint recognition unit, a digit password recognition unit, and a pattern password recognition unit.

Based on the verification result, if the first verification processing unit succeeds in verification, a payment operation is performed according to an existing procedure. Specifically, if the matching succeeds, the terminal sends a payment request to a payment server. Alternatively, if this operation is performed after the terminal receives a payment confirmation sent by the payment server, the terminal sends payment confirmation information to the payment server after the matching succeeds. Alternatively, if the matching succeeds, a payment password that is securely pre-stored is locally obtained from the terminal, and then the payment password is sent to the payment server for verification. If the first verification processing unit fails in verification, the procedure ends.

It should be noted that, a manner of performing the payment operation when the verification succeeds is, for example, allowing the terminal (namely, the mobile phone) to continue to interact with the POS machine, for example, to complete data required for the current payment, which may specifically comply with an existing protocol, for example, at least one of a people's bank of China (the people's bank of China, PBOC) standard and an EMV standard. This is not limited herein.

It should be noted that S1103 in this embodiment may be different from S1030 in FIG. 10. In this step, the APP may transmit, to the OS, an instruction for invoking an identity authentication processing unit. It may be understood that the APP does not limit an identity authentication manner used by the OS, provided that a user identity can be verified. Therefore, when a determining result of the step S1104 is that the obtained current placement posture information of the terminal does not meet the preset range, it is more appropriate to perform the step S1105. However, when it is specified in the step S1103 that the facial recognition processing unit is invoked, if the determining result of the step S1104 is that the obtained current placement posture information of the terminal does not meet the preset range, S1105 may not be performed, but the procedure directly ends.

In addition, it should be noted that S1107 and S1108 may be replaced with the following steps:

The APP sends the received face image to a server, and the server matches a face image template pre-stored on the server side with the obtained first image, to determine a matching result. The face image template pre-stored on the server side may be obtained in a manner in which the user submits face image information to the server when registering an account (for example, binding and downloading a bank card application in an electronic wallet), and the server saves the face image information as the face image template.

The server sends the matching result to the APP, and the APP performs determining based on the matching result. If the matching succeeds, a payment operation corresponding to the payment request is executed according to the existing procedure. If the matching fails, the APP may prompt the user to perform verification again by using the first verification processing unit. The prompt manner may include at least one of a voice prompt and a text prompt on an APP interface. The first verification processing unit may include at least one of a fingerprint recognition unit, an iris recognition unit, a voiceprint recognition unit, a digit password recognition unit, and a pattern password recognition unit. Alternatively, the server directly determines, based on the matching result, whether to continue to perform a subsequent payment operation. The method provided in this embodiment is similar to the method described in FIG. 10, and in the two methods, whether it is convenient to trigger the facial recognition processing unit to verify a user identity is determined based on a current actual status, and a facial recognition technology with relatively good user experience can be used to verify the user identity to a relatively large extent and relatively efficiently.

As shown in FIG. 10 and FIG. 11, a case in which the terminal approaches the POS machine for a second time during identity authentication is not considered. In the NFC payment scenario, an electronic wallet needs to be designed to meet a requirement of approaching the POS machine twice. Therefore, in a technical solution, it needs to consider associating two consecutive operations of approaching the POS machine by presetting a time interval (for example, if the time interval between two operations of approaching the POS machine is less than a preset time interval, it is considered that two consecutive actions of approaching the POS machine are performed to complete a same payment, otherwise, it is considered that the two actions of approaching the POS machine are not associated), and it also needs to consider using a result of an operation between the operations of approaching the POS machine (namely, an operation performed in a time period of leaving the POS machine between the two operations of approaching the POS machine, for example, a facial recognition operation) in a process of approaching the POS machine for the second time for payment. Therefore, the embodiment of FIG. 12A and FIG. 12B relates to this application scenario.

Figure 12A:
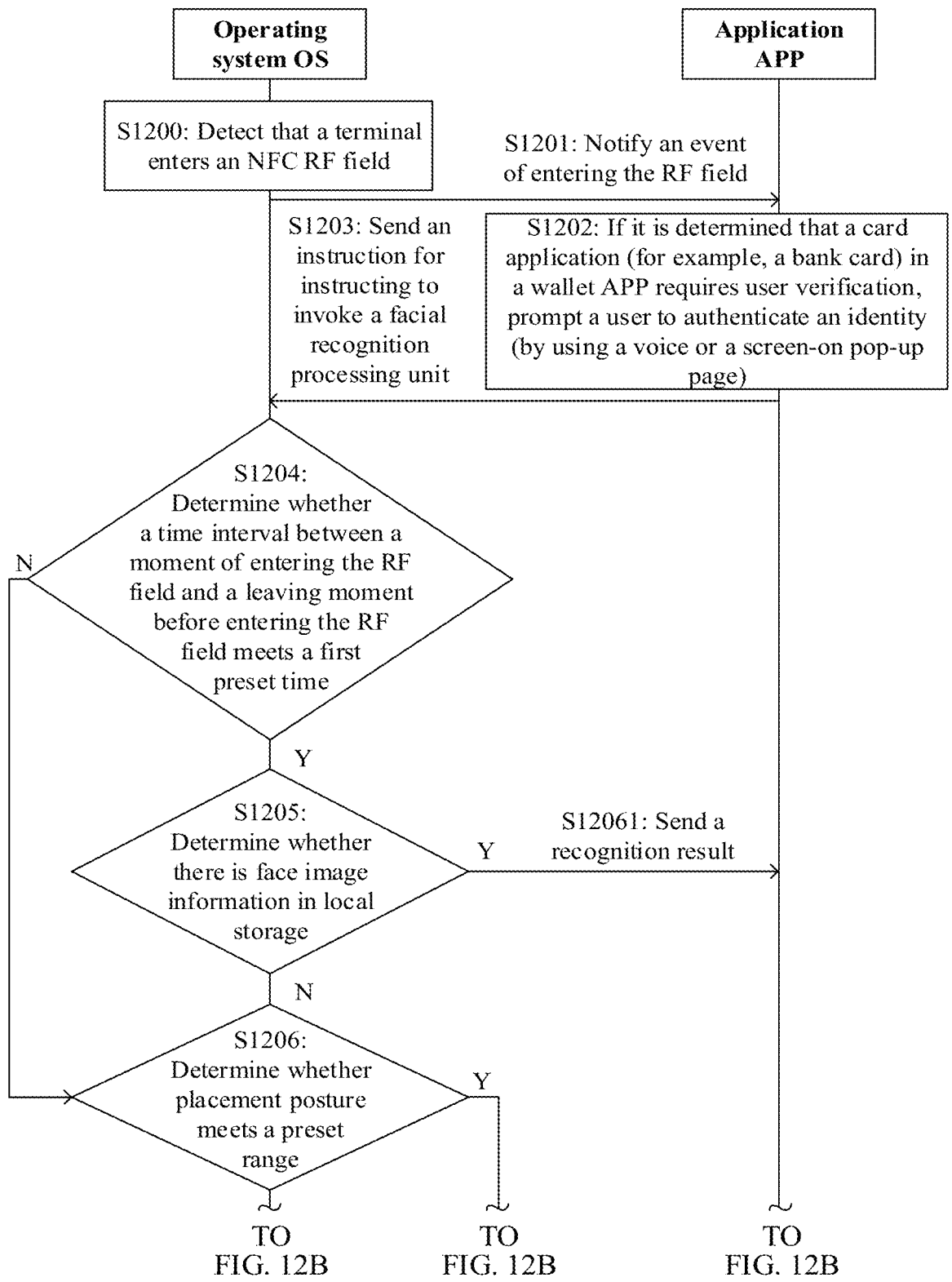
FIG. 12A and FIG. 12B are a schematic flowchart of still another facial recognition-based payment method for near field communication in an NFC payment scenario according to an embodiment of this application.
Figure 12B:
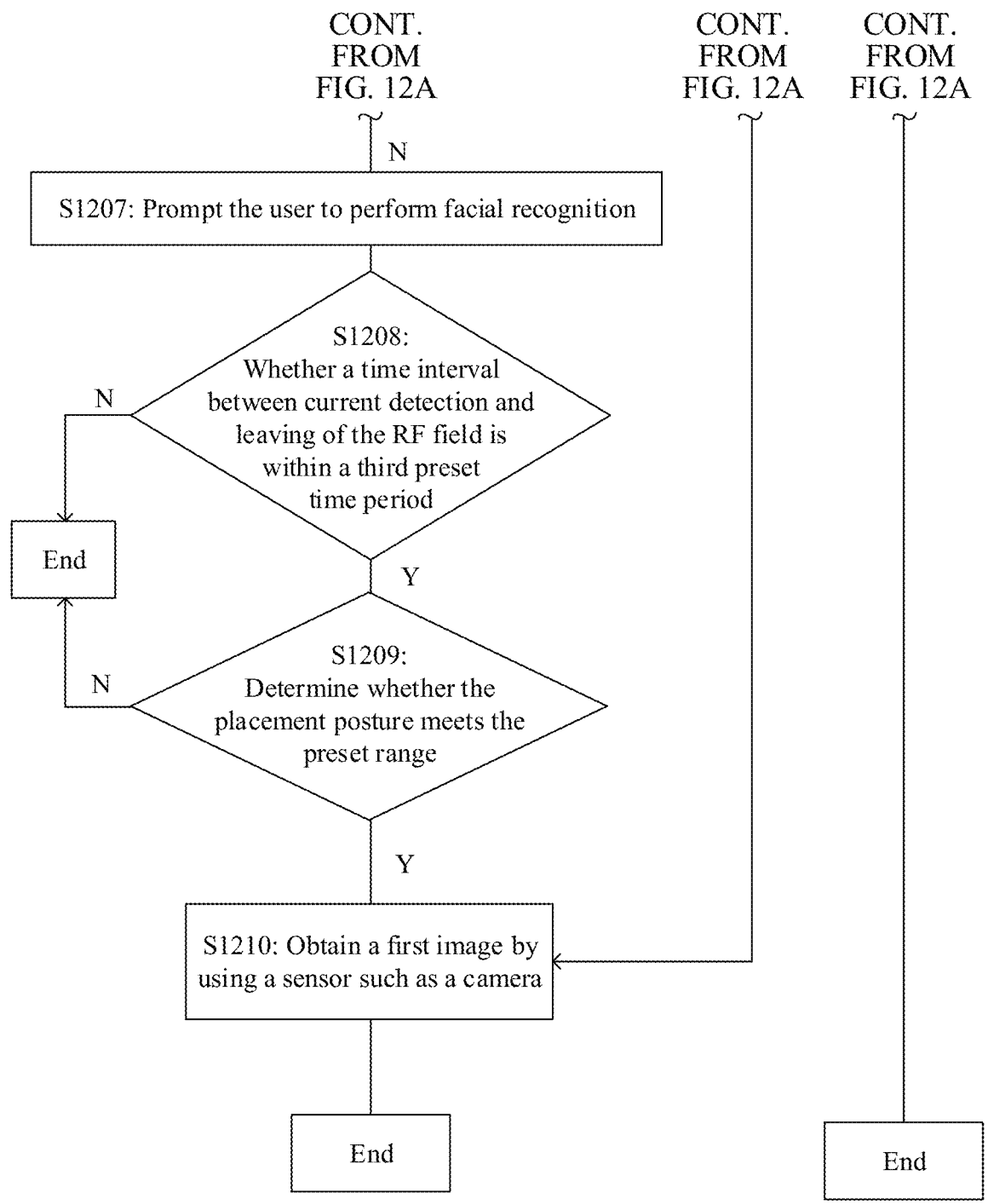

FIG. 12A and FIG. 12B are a schematic flowchart of still another facial recognition-based payment method for near field communication in an NFC payment scenario according to an embodiment of this application. As shown in FIG. 12A and FIG. 12B, the method provided in this embodiment may include the following steps: whether it is detected that a terminal leaves an NFC PF field is used as a determining condition, and if an OS detects that the terminal leaves the RF field, the OS directly triggers a facial recognition processing unit (in this case, the terminal is in a position that is convenient for capturing a face image by default), or the OS further performs determining with reference to placement posture information of the terminal (in this case, whether it is convenient to capture a face image needs to be determined with reference to the placement posture information of the terminal), to store a face image detected in a process of leaving the RF field or a recognition result of the detected face image, for use in a payment process when the terminal approaches a POS machine next time (for example, the terminal approaches the POS machine again for payment within a preset time period from a previous approach to the POS machine or within a preset time period from a current leave from the RF field).

Specifically, S1200 to S1212 may be included.

For S1200 to S1203, refer to the operations performed in S1010 to S1030 in FIG. 10 and the operations performed in S1100 to S1103 in FIG. 11, and details are not described herein again.

S1204: In response to a received instruction for invoking the facial recognition processing unit, the OS determines whether a time interval between a first moment and a second moment is less than or equal to a first preset time period. The first moment is a moment at which the OS detects that the terminal enters the NFC RF field in S1200, the second moment is a moment at which it is detected last time before the first moment that the terminal leaves or enters the NFC radio-frequency field.

During implementation, considering that an operation speed of each user is different, a setting of a value of the first preset time period may not be strictly limited, for example, 60 seconds or 30 seconds. In addition, a prompt may be sent to the user by using a voice, a user interface UI, or the like. For example, after the user puts a mobile phone close to the POS machine for the first time, the user picks up the mobile phone for facial recognition. After the recognition succeeds, the user may be prompted to approach the POS machine again within 60 seconds to complete payment.

Specifically, it may be understood that, for example, when the second moment is a moment at which it is detected last time before the first moment that the terminal leaves the NFC radio-frequency field, and the time interval between the first moment and the second moment is less than or equal to the first preset time period, it is detected in S1200 that the terminal enters the NFC RF field for the second time. When the time interval between the first moment and the second moment is greater than the first preset time period, it is detected in S1200 that the terminal enters the NFC RF field for the first time, and S1206 is performed.

It should be noted that, in this embodiment of the present invention, the first moment is not limited. In this step, only a moment at which the OS detects this time that the terminal enters the NFC radio-frequency field is used as an example. Certainly, in specific implementation, another moment may also be used, for example, a moment at which the OS receives an instruction sent by the APP for invoking the facial recognition processing unit.

S1205: When the time interval between the first moment and the second moment is less than or equal to the first preset time period, the OS determines whether there is stored face image information on the terminal. The stored face image information may include face image information that is stored on the terminal when the terminal leaves the NFC radio-frequency field in a first preset time period before the terminal detects a payment event. The stored face image information herein may be a face image collected by the terminal or a result of recognizing the collected face image (by the terminal or a server). Specifically, the terminal detects last time before a current moment (or in other words, before the first moment) at least one of a face image collected within a second preset time period after the terminal leaves the NFC radio-frequency field and a recognition result of the collected face image. For example, one understanding is that, before the first moment and within a time period after the NFC RF field is detected last time, the user may pick up the mobile phone, and put the mobile phone away from an NFC sensing area of the POS machine, so that the mobile phone collects a face image of the user.

It should be noted that after detecting the payment event and before obtaining the placement posture information of the terminal, the terminal determines whether there is a stored face image in the terminal. The first moment may be a moment at which the terminal detects that the terminal enters the NFC radio-frequency field, and the second moment may be a moment at which the terminal detects last time before the first moment that the terminal leaves or enters the NFC radio-frequency field. Certainly, the operation of determining whether there is stored face image information on the terminal herein may also occur before an operation, described in the following step S1206, of determining whether current placement posture information of the terminal meets a preset range.

When the OS determines that there is stored face image information on the terminal, S12061 is performed; and when the OS determines that there is no stored face image information on the terminal, S1206 is performed.

It should be noted that, in the step S1205, the current moment may be a moment at which the terminal determines whether there is stored face image information, and certainly, may be another moment, for example, a moment (namely, the first moment) at which the terminal detects this time that the terminal enters the NFC radio-frequency field.

S12061: Send a recognition result of the face image to the APP, and the APP executes a subsequent procedure based on the recognition result of the face image. If the recognition result of the face image is that matching succeeds, the APP performs a subsequent payment operation. If the verification fails, the procedure ends. Alternatively, the APP may prompt the user to perform verification again by using the first verification processing unit. The prompt manner may include at least one of a voice prompt and a text prompt on an APP interface.

In the step S1205, if there is stored face image information locally, the information may be sent to the APP. In the step S1206, only an example in which the recognition result of the face image is transmitted is used. Certainly, a case in which the stored face image information is a face image and the face image is transmitted to the APP is not excluded. In this case, the APP may send the face image to a corresponding payment server for matching.

For the step S12061, refer to the steps S1070 and S1080 in FIG. 10 or the steps S1107 and S1108 in FIG. 11. Details are not described herein again.

S1206: The OS determines whether the obtained current placement posture information of the terminal meets a preset range. The placement posture information is used to determine a tilt angle of the terminal relative to a first plane.

If the obtained current placement posture information of the terminal does not meet the preset range, S1207 to S1210 are performed. If the obtained current placement posture information of the terminal meets the preset range, S1210 is performed.

S1207: The OS may prompt the user to perform facial recognition, so that the user adjusts the terminal to a position suitable for capturing a face image.

It should be noted that when S1207 is performed, the terminal may leave the NFC RF field of the POS machine because the user adjusts the terminal to the position suitable for capturing a face image. In this case, the terminal may record a moment at which the terminal leaves the NFC RF field.

S1208: The OS needs to determine whether a time interval between the moment at which the terminal leaves the NFC RF field and a moment at which current facial recognition is performed meets a range of a third preset time period.

If the time interval between the moment at which the terminal leaves the NFC RF field and the moment at which the current facial recognition is performed meets the range of the third preset time period, S1209 is performed. If the time interval between the moment at which the terminal leaves the NFC RF field and the moment at which the current facial recognition is performed does not meet the range of the third preset time period, the procedure ends.

It should be noted that the step S1208 is optional, and S1209 may be directly performed after S1207.

S1209: Determine whether the current placement posture information of the terminal meets the preset range. The placement posture information is used to determine the tilt angle of the terminal relative to the first plane.

If the current placement posture information of the terminal meets the preset range, S1210 is performed. If the current placement posture information of the terminal does not meet the preset range, the procedure ends, or it is determined to trigger the first verification processing unit to complete verification. If the first verification processing unit succeeds in verification, a payment operation is performed according to an existing procedure. This is not limited in the prior art. If the first verification processing unit fails in verification, the procedure ends.

S1210: The OS invokes a facial recognition module to obtain and store a first image.

It should be noted that an objective of S1208 to S1210 is to obtain the stored face image information in S1205. In other words, S1208 to S1210 are performed to store the first image obtained by the terminal, or store a result of matching the first image with the face image (namely, the face image information).

In the method provided in this embodiment, it is considered whether the terminal enters the NFC RF field for the first time, or it may be understood that the terminal needs to detect whether there is face image information in local storage. If there is face image information, it may be determined that it is the second time that the terminal enters NFC RF field. On the contrary, if there is no face image information, it is determined that it is the first time that the terminal enters the NFC RF field, and actions subsequently performed may be S1104 to S1108 in FIG. 11. This method can reduce active input actions of the user, better enhance user experience, and improve identity authentication efficiency during payment.

It may be learned with reference to FIG. 10 to FIG. 12B that, compared with an identity authentication manner in existing mobile payment, the method provided in this embodiment of the present invention can enable the terminal to determine, based on a current actual status (in other words, with reference to a placement posture of the terminal during NFC payment or code scanning payment), whether it is convenient to trigger the facial recognition processing unit to verify a user identity, and can use a facial recognition technology with relatively good user experience to verify the user identity to a relatively large extent and relatively efficiently. With the facial recognition technology, an identity authentication operation is completed more naturally and seamlessly. This reduces active input actions of the user, better enhances user experience, and improves identity authentication efficiency during payment.

In the following embodiments, a facial recognition-based payment method is described in detail with reference to FIG. 13 and FIG. 14 by using a code scanning payment scenario as an example. In the code scanning payment scenario, in the following embodiments shown in FIG. 13 and FIG. 14, determining is performed with reference to a placement posture of a mobile phone, because it can be more likely to ensure that a face is within a photographing range of a front-facing camera. This improves a success rate of facial recognition to some extent.

Figure 13:
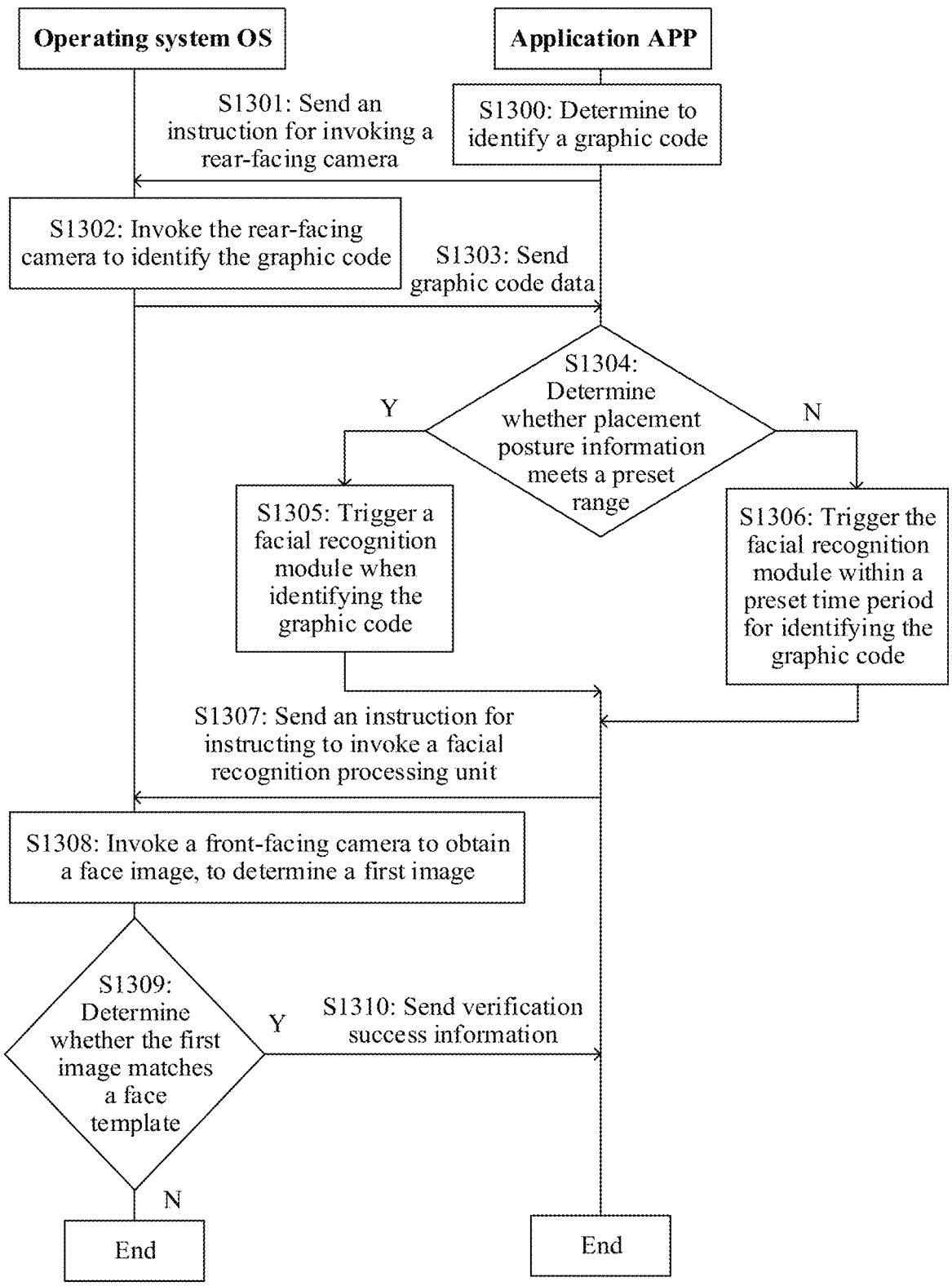
FIG. 13 is a schematic flowchart of a facial recognition-based payment method for a code scanning payment scenario according to an embodiment of this application.

FIG. 13 is a schematic flowchart of a facial recognition-based payment method for a code scanning payment scenario according to an embodiment of this application. As shown in FIG. 13, for ease of description, an example in which an operating system (operating system, OS) and an application (application, APP) interact with each other between different units in a terminal is used for description. The method provided in this embodiment may include the following steps: when a verification method is applicable to a payment operation performed by identifying a graphic code (for example, at least one of a two-dimensional code and a bar code), the APP determines whether placement posture information of the terminal is within a preset range (namely, a location range convenient for detecting a face image of a user, for example, including a side of a display screen, tilting 45 to 90 degrees towards the user), if the placement posture information of the terminal is within the preset range, it is determined to trigger a facial recognition processing unit when invoking a rear-facing camera for code scanning, to obtain a face image by using a front-facing camera, and if the placement posture information of the terminal is not within the preset range, verification is performed on the user in an existing verification manner (for example, a digit password, a pattern password, a voiceprint password, or a fingerprint password), or it is determined to trigger the facial recognition processing unit to perform verification on the user within a preset time period after scanning succeeds; and then, whether to perform a subsequent transaction process is determined based on a facial recognition result (obtained by the OS or obtained by a request server).

Specifically, S1300 to S1309 may be included.

S1300: The APP determines to identify a graphic code. The graphic code is at least one of a two-dimensional code or a bar code.

Specifically, the APP determines, according to an operation instruction of the user, to identify the graphic code. For example, the user selects a code scanning function on an APP interface.

S1301: The APP sends, to the OS, an instruction for invoking a photographing apparatus (for example, a rear-facing camera) of the terminal.

Specifically, a manner in which the APP invokes the rear-facing camera of the terminal is not limited in this embodiment of the present invention. Using an Android system as an example, this manner may be similar to the manner of invoking the facial recognition processing unit in the step S1050 in FIG. 10. Details are not described herein again.

S1302: The OS invokes, in response to the received instruction for invoking the rear-facing camera, the rear-facing camera to identify the graphic code, to determine graphic code data.

Specifically, a specific manner in which the terminal identifies the graphic code, for example, scans and identifies the two-dimensional code, may be the prior art, and is not described herein.

S1303: The OS sends the determined graphic code data to the APP, so that the APP processes the graphic code data.

It should be noted that the graphic code data may include information required for completing payment or payment collection, for example, a payment code or a receipt code implemented in a payment application such as Alipay or WeChat payment. For details, refer to the prior art. Details are not described herein.

The step S1303 is optional, in other words, it may be understood that while the APP invokes the rear-facing camera to identify the graphic code, S1304 is performed.

S1304: The APP determines whether obtained current placement posture information of the terminal meets a preset range. The placement posture information is used to determine a tilt angle of the terminal relative to a first plane.

S1305: If the obtained current placement posture information of the terminal meets the preset range, the APP triggers the facial recognition processing unit when identifying the graphic code data.

It should be noted that, if the step S1303 has been performed, the step S1305 may be explained as follows: The APP triggers the facial recognition processing unit when analyzing the graphic code data and determining that the graphic code data includes the information required for completing payment or payment collection. If the step S1303 is not performed, the step S1305 may be explained as follows: The APP triggers the facial recognition processing unit when invoking the rear-facing camera to scan the graphic code data.

S1306: If the obtained current placement posture information of the terminal does not meet the preset range, the APP triggers the facial recognition processing unit within a preset time period for completing recognition of the graphic code data.

It should be noted that, in the step S1306, it is considered that the user may pick up a mobile phone to a position suitable for capturing a face image after completing code scanning. For example, when the two-dimensional code is horizontally pasted on a desktop of a merchant, after the user places the mobile phone horizontally for code scanning, it is convenient to capture a face image in the process of picking up the mobile phone. Therefore, a time point for the APP to invoke the facial recognition processing unit may be appropriately delayed, to complete identity authentication when the user is not obviously aware of the operation and does not need to perform another active operation. Certainly, this step may be alternatively implemented in another manner. For example, when the APP determines that the placement posture information of the terminal does not meet the preset range, the procedure directly ends, or verification is performed on the user in another existing verification manner (for example, fingerprint recognition, a digit password, or a pattern password).

For S1307 to S1310, refer to the operations performed in S1050 to S1080 in FIG. 10, and details are not described herein again.

It should be noted that in S1303, after receiving the graphic code data, the APP may perform, when determining that parsed-out data is a payment collection account, a step of determining the placement posture information of the terminal and a possible step of performing facial recognition, and then complete a subsequent process by using facial recognition information. Alternatively, the APP may directly perform a step of determining the placement posture information of the terminal and a possible step of performing facial recognition, and then use the facial recognition information when determining that the graphic code data is a payment collection account, and may not use facial recognition-related data when determining that the graphic code data is not a payment collection account.

It should be noted that S1309 and S1310 may be replaced with the following steps:

The OS sends an obtained first image to the APP.

The APP sends the received first image (face image) to a server, and the server matches a face image template pre-stored on the server side with the obtained first image, to determine a matching result.

A serving end sends the matching result to the APP, and the APP performs determining based on the matching result. If the matching succeeds, a payment operation corresponding to a payment request is executed according to an existing procedure. If the matching fails, the APP may prompt the user to perform verification again by using a first verification processing unit. The prompt manner may include at least one of a voice prompt and a text prompt on an APP interface. The first verification processing unit includes at least one of a fingerprint recognition unit, an iris recognition unit, a voice-print recognition unit, a digit password recognition unit, and a pattern password recognition unit.

It may be learned with reference to FIG. 13 that, compared with an identity authentication manner in existing mobile payment, the method provided in this embodiment can enable the terminal to determine, based on a current actual status, whether it is convenient to trigger the facial recognition processing unit to verify a user identity, and can use a facial recognition technology with relatively good user experience to verify the user identity to a relatively large extent and relatively efficiently. With the facial recognition technology, an identity authentication operation is completed more naturally and seamlessly. This reduces active input actions of the user, better enhances user experience, and improves identity authentication efficiency during payment.

Figure 14:
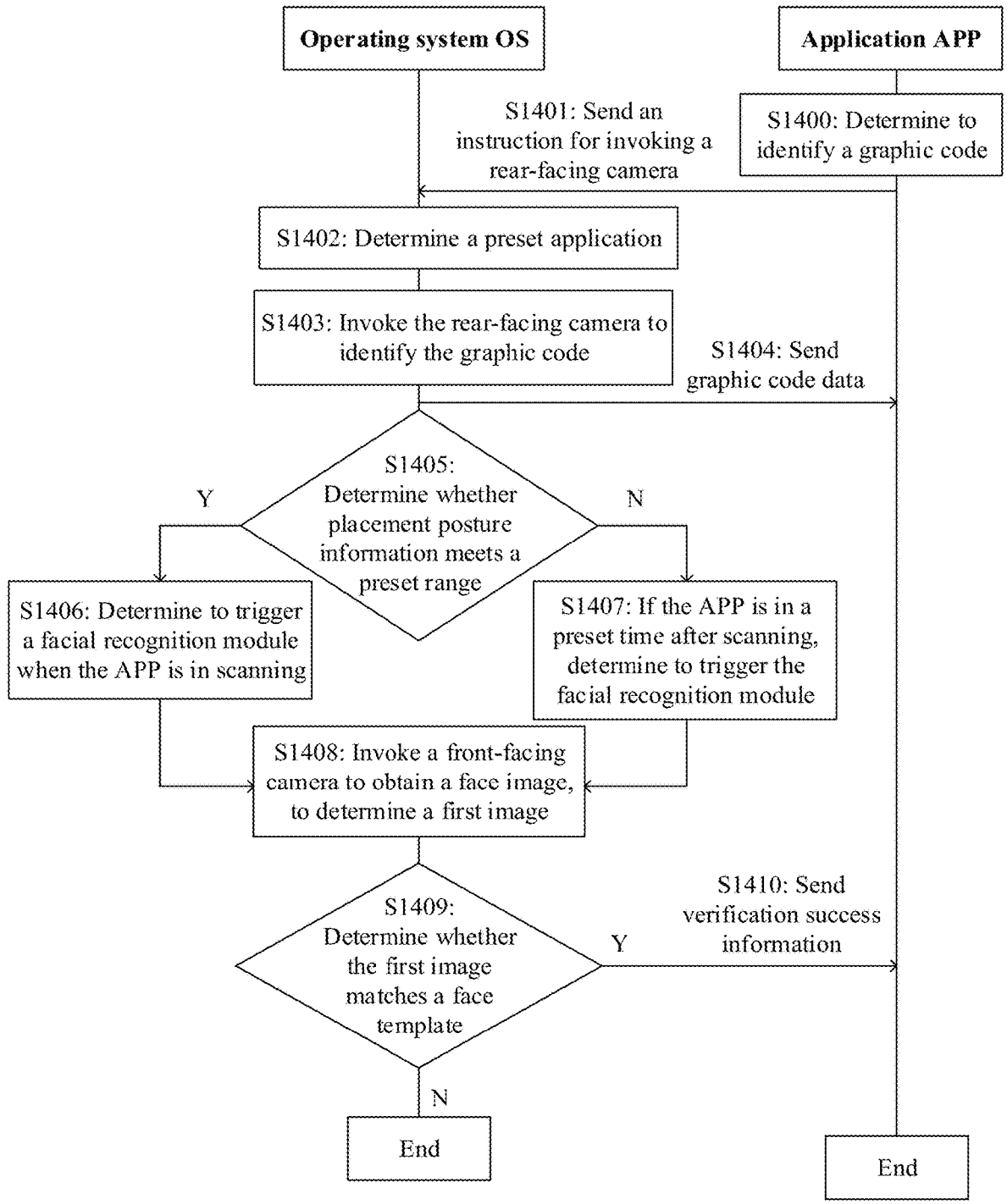
FIG. 14 is a schematic flowchart of another facial recognition-based payment method for a code scanning payment scenario according to an embodiment of this application.

FIG. 14 is a schematic flowchart of another facial recognition-based payment method for a code scanning payment scenario according to an embodiment of this application. As shown in FIG. 14, for ease of description, an example in which an operating system (operating system, OS) and an application (application, APP) interact with each other between different units in a terminal is used for description. The method provided in this embodiment may include the following steps: if the OS determines that the application APP invokes a rear-facing camera for code scanning (the APP is a preset application, for example, a specific payment application), and if the OS determines that placement posture information of the terminal is within a preset range (namely, a location range convenient for detecting a face image of a user, for example, including a side of a display screen, tilting 45 to 90 degrees towards the user), the OS determines to trigger a facial recognition processing unit when the rear-facing camera is invoked for code scanning, to obtain a face image by using a front-facing camera, otherwise, the OS determines to trigger the facial recognition processing unit within a preset time period after a graphic code is successfully identified; and then, the OS sends a recognition result to the APP (the OS actively pushes the recognition result or feeds back the recognition result as required by the APP), so that the APP determines, based on the face result, whether to allow execution of a subsequent payment operation.

Specifically, S1400 to S1410 may be included.

For S1400 and S1401, refer to the operations performed in S1300 and S1301 in FIG. 13, and details are not described herein again.

S1402: The OS determines that the APP that identifies the graphic code is a preset application.

Specifically, the APP (namely, a third application) in the terminal invokes an identification function of the terminal to identify the graphic code. The APP is in a preset application list of the terminal, and an application included in the preset application list has a payment function. In other words, the terminal may first perform screening once by determining whether the application that invokes the payment function is in a whitelist (namely, the preset application list), to improve accuracy.

The preset application list may be determined by the OS based on an application type. For example, a common application having a payment function (and supporting image recognition and being used for payment) is determined as a preset application, or may be determined by the OS based on a user setting. This is not limited in this embodiment of the present invention.

When the OS determines that the APP that identifies the graphic code is not an application included in the preset application list, the procedure ends.

It should be noted that S1402 is also applicable to the scenarios in FIG. 10 to FIG. 12B.

S1403: The OS invokes, in response to a received instruction for invoking the rear-facing camera, the rear-facing camera to identify the graphic code, to determine graphic code data.

S1404: The OS sends the determined graphic code data to the APP.

Specifically, this step may also be performed after S1406 or before S1407.

S1405: The OS determines whether obtained current placement posture information of the terminal meets a preset range. The placement posture information is used to determine a tilt angle of the terminal relative to a first plane.

S1406: When the obtained current placement posture information of the terminal meets the preset range, if the APP that invokes the rear-facing camera is a preset application and is in code scanning, determine to trigger the facial recognition processing unit.

It should be noted that the graphic code data may include information required for completing payment or payment collection, for example, a payment code or a receipt code implemented in a payment application such as Alipay or WeChat payment. For details, refer to the prior art. Details are not described herein.

The step S1404 is optional, in other words, it may be understood that while the APP invokes the rear-facing camera to identify the graphic code, S1406 is performed. In this case, S1404 is not performed.

S1407: When the obtained current placement posture information of the terminal meets the preset range, if the APP that invokes the rear-facing camera is a preset application and is within a preset time period after code scanning, determine to trigger the facial recognition processing unit.

Optionally, when the obtained current placement posture information of the terminal does not meet the preset range, the procedure may be directly ended. In this case, S1404 needs to be performed.

For S1408 to S1410, refer to the steps S1308 to S1310 in FIG. 13, and details are not described herein again.

It should be noted that S1409 and S1410 may be replaced with the following steps:

The OS sends an obtained first image to the APP.

The APP sends the received first image (namely, the following face image to a serving end (for example, a server), and the server matches a face image template pre-stored on the server side with the received face image, to determine a matching result.

The serving end sends the matching result to the APP, and the APP performs determining based on the matching result. If the matching succeeds, a payment operation corresponding to a payment request is executed according to an existing procedure. If the matching fails, the APP may prompt the user to perform verification again by using a first verification processing unit. The prompt manner may include at least one of a voice prompt and a text prompt on an APP interface. The first verification processing unit includes at least one of a fingerprint recognition unit, an iris recognition unit, a voiceprint recognition unit, a digit password recognition unit, and a pattern password recognition unit.

With reference to FIG. 13 and FIG. 14, it can be learned that, compared with an existing identity authentication manner in mobile payment, in the method provided in this embodiment of the present invention, a best time point is determined based on an actual status (for example, a placement posture, or even APP information and a purpose of the preset event) of a mobile phone in a preset event (for example, entering an NFC radio-frequency field or identifying a graphic code), to trigger the facial recognition processing unit. Regardless of whether the graphic code is being identified or the mobile phone is picked up after the graphic code is identified, or whether the terminal is approaching a POS machine or the terminal is picked up when the terminal leaves the POS machine, a facial recognition technology that the user does not perceive and has relatively good experience can be used to verify a user identity to a relatively large extent and relatively efficiently.

In addition, in addition to that the terminal identifies the graphic code in the foregoing description, a graphic code on the terminal may also be identified. For example, the terminal invokes a wallet APP, and when a page of a payment code is displayed, the payment code can be scanned by another terminal, to complete a current payment operation. In this case, similar to the solutions in FIG. 13 or FIG. 14, when it is detected that the terminal generates or displays a graphic code for identification by another terminal, a facial recognition processing unit module may be synchronously triggered. A specific manner is not described again.

Figure 15:
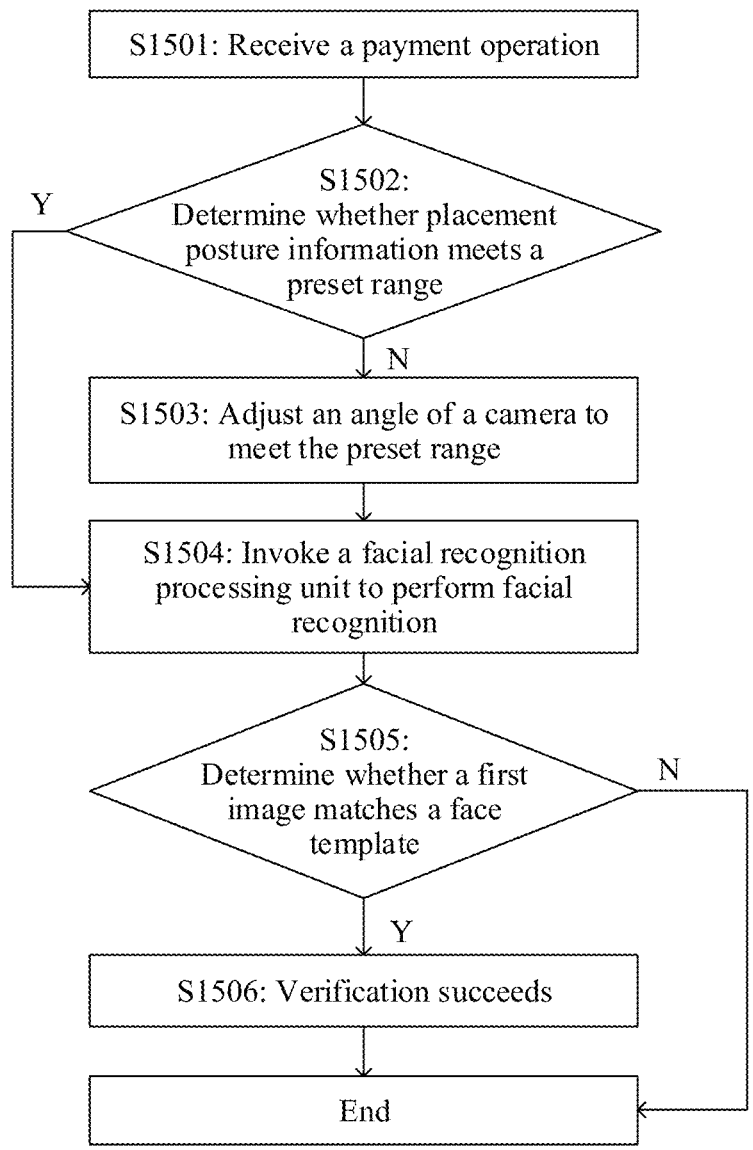
FIG. 15 is a schematic flowchart of still another facial recognition-based payment method for a code scanning payment scenario according to an embodiment of this application.

FIG. 15 is a schematic flowchart of yet another facial recognition-based payment method for a code scanning payment scenario according to an embodiment of this application. Different from the descriptions of FIG. 10 to FIG. 14, in the description of FIG. 15, for a terminal on which a camera is movable (for example, the camera can rotate by 180 degrees to 360 degrees in at least one of the following manners: sliding upwards, sliding downwards, sliding leftwards, and sliding rightwards), the camera of the mobile phone is dynamically adjusted based on an actual status (whether placement posture information meets a preset range, or even whether an APP is a preset application, or whether a purpose of the preset event is payment) of the mobile phone in a preset event, to find an angle that is most suitable for capturing a face image, to complete identity authentication.

Specifically, S1501 to S1505 may be included.

S1501: The terminal detects a payment event. The payment event may include NFC-based payment event near field communication (similar to content related to the payment events shown in FIG. 10, FIG. 11, FIG. 12A, and FIG. 12B, For example, the terminal detects at least one of the following cases: the terminal enters a near field communication NFC radio-frequency field; the terminal determines to use a first application on the terminal or a second application in the first application; and the terminal determines whether the used first application on the terminal or the second application in the first application requires user identity authentication) and code scanning-based payment event (similar to the payment event shown in FIG. 13 or FIG. 14, for example, at least one of scanning a two-dimensional code or a bar code by using a rear-facing camera, and determining, by analyzing the scanned two-dimensional code or bar code, that a purpose of this scanning is payment).

S1502: The terminal determines whether obtained current placement posture information of the terminal meets a preset range. The placement posture information is used to determine a tilt angle of the terminal relative to a first plane.

If the current placement posture information of the terminal does not meet the preset range, the terminal performs the step S1503. If the current placement posture information of the terminal meets the preset range, the terminal performs the step S1504.

Specifically, the placement posture information may be the tilt angle of the terminal relative to the first plane, and more specifically, may be a tilt angle of a camera on the terminal relative to the first plane. Certainly, the placement posture information may also be other information, for example, parameter information used to determine the tilt angle of the terminal relative to the first plane.

S1503: The terminal automatically adjusts a placement posture of the terminal to meet the preset range.

Specifically, the terminal may adjust the placement posture of the terminal by adjusting an angle of the camera on the terminal.

A specific manner of adjusting the angle of the camera on the terminal to an optimal angle includes but is not limited to any one of the following:

Manner 1: Preconfigure adjustment reference information, for example, a terminal location 1 corresponds to an optimal capture angle a, a terminal location 2 corresponds to an optimal capture angle b, and so on, to adjust, based on the preconfigured adjustment reference information, a capture angle to an optimal capture angle corresponding to a current location of the terminal.

Manner 2: Enable the camera, rotate the camera at a preset speed or interval, obtain a face image at the same time, and stop adjustment when a feature point of the obtained face image meets a requirement.

Manner 3: Perform control according to a voice instruction of a user.

If the current placement posture information of the terminal meets the preset range, S1504 is performed.

S1504: When the terminal automatically adjusts a shooting angle of the camera to meet the preset range, the terminal invokes a facial recognition processing unit to capture a face image to complete facial recognition.

For S1505 and S1506, refer to the steps S1070 and S1080 in FIG. 10, and details are not described herein again.

It can be learned with reference to FIG. 15 that, compared with an identity authentication manner in existing mobile payment, according to the method provided in this embodiment of the present invention, the angle of the camera can be dynamically adjusted based on a current actual status of the terminal, to find an optimal angle to trigger the facial recognition processing unit, and with a facial recognition technology, an identity authentication operation can be completed more naturally and seamlessly. This reduces active input actions of the user, better enhances user experience, and improves identity authentication efficiency during payment.

Compared with the methods in FIG. 10 to FIG. 14, in the method provided in this embodiment of the present invention, whether to dynamically adjust the camera to the optimal capture angle, instead of whether to use a facial recognition manner or use a facial recognition manner after the user puts the mobile phone in a proper position, may be determined based on an actual status (for example, placement posture information, or even APP information and the purpose of the preset event) of the mobile phone in a process of a payment event (for example, NFC payment or code scanning payment). Apparently, in the method provided in this embodiment of the present invention, an unaware and smooth identity authentication manner such as facial recognition can be used with a higher probability.

It should be noted that the verification method provided in the present invention may also be used in another scenario, for example, access control, express delivery receiving, and friend adding. For example, the embodiments shown in FIG. 10 to FIG. 12B and FIG. 15 may be applicable to an NFC unlocking scenario (including but not limited to scenarios of a home door, a vehicle door, and company access control), and the embodiments shown in FIG. 13 to FIG. 15 may be applicable to a code scanning scenario such as code scanning for delivery or friend adding. All of these can ensure that when executing these services, the terminal can conveniently verify an identity of a user based on the facial recognition technology, to avoid that a current user of the terminal is an unauthorized user (in other words, the current user is not an owner or a user authorized by the owner of the terminal).

Figure 16:
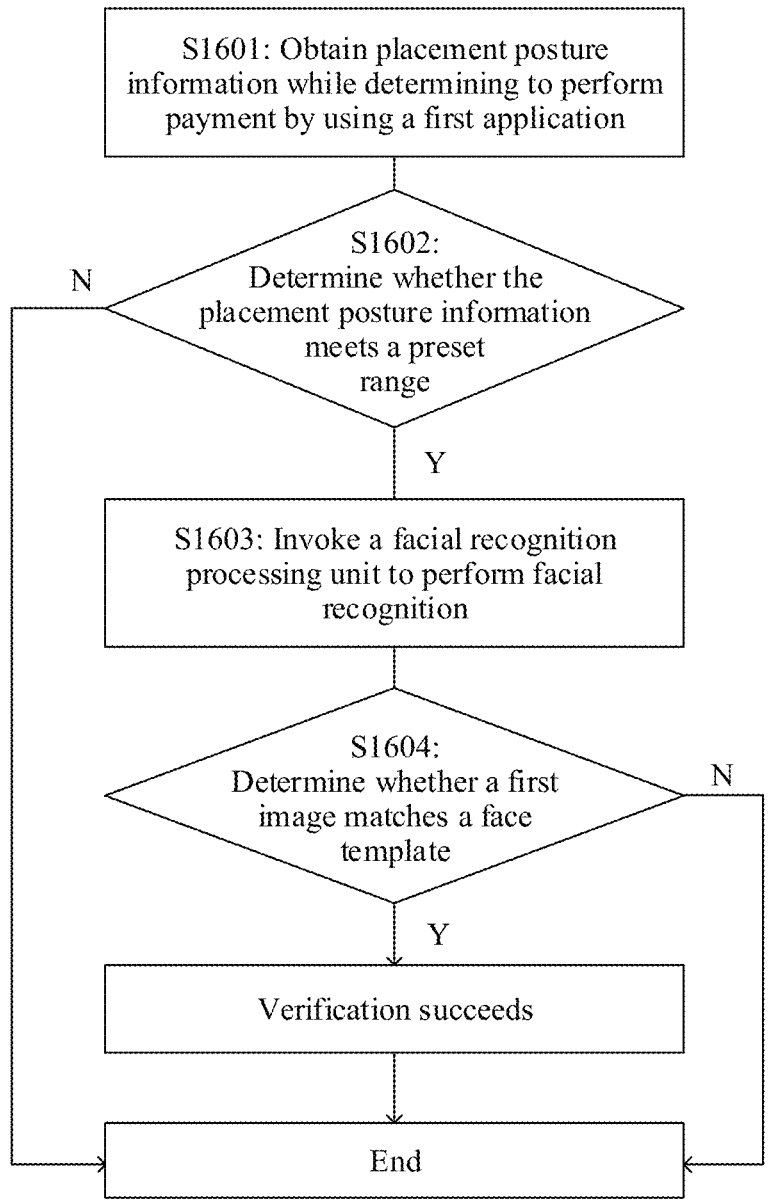
FIG. 16 is a schematic flowchart of yet another facial recognition-based payment method for a code scanning payment scenario according to an embodiment of this application.

In addition to the scenarios provided in the foregoing embodiments, there is another scenario in which when a merchant initiates payment collection, and a user needs to provide a graphic code, the following operations are performed (for example, FIG. 16 is a schematic flowchart of yet another facial recognition-based payment method for a code scanning payment scenario according to an embodiment of this application):

S1601: A terminal obtains placement posture information of the terminal while determining to perform payment by using a first application. The placement posture information is used to determine a tilt angle of the terminal relative to a first plane.

For example, the first application may be a WeChat application, and the terminal determines to perform payment by using WeChat. Specifically, when a user opens a payment code in WeChat, the terminal may obtain the placement posture information of the terminal.

S1602: The terminal determines whether the tilt angle meets a preset range; if the tilt angle meets the preset range, S1603 is performed; and if the tilt angle does not meet the preset range, the procedure ends.

S1603: The terminal invokes a front-facing camera to obtain a face image, to determine a first image.

S1604: Determine, based on the first image and a face image template pre-stored on the terminal, whether the first image matches the face image template preset in the terminal.

If the matching succeeds, verification success information is determined, and a payment operation corresponding to a payment request is performed.

If the matching fails, no further operation is required. Alternatively, the first application may prompt the user to perform verification again by using a first verification processing unit. The prompt manner may include at least one of a voice prompt and a text prompt on an APP interface.

FIG. 7 is a schematic diagram of a structure of a facial recognition-based payment terminal according to an embodiment of this application. The terminal 700 specifically includes: one or more processors 180, a memory 130, a plurality of applications, and one or more computer programs, where the one or more computer programs are stored in the memory 130, the one or more computer programs include an instruction, and when the instruction is executed by the terminal, the terminal is enabled to perform the following steps:

obtaining placement posture information of the terminal when detecting a payment event, where the placement posture information is used to determine a tilt angle of the terminal relative to a first plane; performing facial recognition on a user when determining that the tilt angle meets a preset range; and when the facial recognition succeeds, performing a payment operation corresponding to the payment event.

The payment event may include: entering a near field communication NFC radio-frequency field; or using a first application or a second application in the first application; or requiring user identity authentication by the used first application or the used second application in the first application.

The payment terminal may further perform the following step: determining that there is no stored face image information in the memory, where the stored face image information is face image information that is stored on the terminal when the terminal leaves the NFC radio-frequency field in a first time period before the terminal detects the payment event.

The payment event may further include: identifying a graphic code; or identifying the graphic code, and determining that the graphic code includes payment collection information or payment information, where the graphic code includes at least one of a two-dimensional code and a bar code.

The payment terminal may further perform the following step: invoking, by using a third application in the memory, an identification function on the terminal to identify the graphic code, where the third application is an application that is included in a whitelist of the memory and that has a payment function.

The payment terminal may further perform the following step: adjusting a tilt angle of a photographing apparatus in the terminal relative to the first plane based on the obtained placement posture information of the terminal, until the tilt angle meets the preset range.

The payment terminal may further perform the following steps: obtaining a first image when determining that the tilt angle meets the preset range; and matching, by the processor, the first image with a pre-recorded face image template. Alternatively, The payment terminal may further perform the following steps: obtaining a first image when determining that the tilt angle meets the preset range; and sending the first image to a server, so that the server matches the first image with a pre-recorded face image template in the server.

It should be noted that, when the tilt angle does not meet the preset range, the payment terminal may further perform the following step: performing identity authentication in a second manner, where the second manner may include at least one of fingerprint recognition, iris recognition, voiceprint recognition, a digit password, and a pattern password. In addition, when it is determined that the facial recognition fails in verification, the processor performs identity authentication in the second manner. The first plane may include at least one of planes that have any included angle with a horizontal plane.

Figure 17:
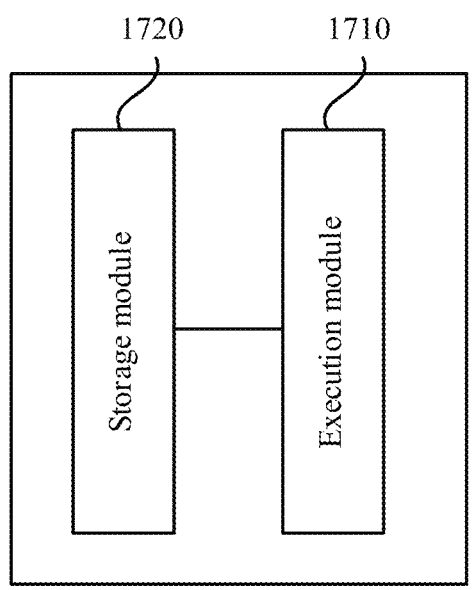
FIG. 17 is a schematic diagram of a structure of a facial recognition-based payment apparatus according to an embodiment of this application.

FIG. 17 is a schematic diagram of a structure of a facial recognition-based payment apparatus according to an embodiment of this application. As shown in FIG. 17, the apparatus specifically includes: an execution module 1710, configured to obtain placement posture information of the payment apparatus when detecting a payment event, where the placement posture information is used to determine a tilt angle of the payment apparatus relative to a first plane. The execution module is further configured to: perform facial recognition on a user when determining that the tilt angle meets a preset range; and when the facial recognition succeeds, perform a payment operation corresponding to the payment event.

The payment event may include: entering a near field communication NFC radio-frequency field; or using a first application or a second application in the first application; or requiring user identity authentication by the used first application or the used second application in the first application.

The payment apparatus may further include a storage module 1720. The payment apparatus determines that there is no stored face image information in the storage module, where the stored face image information is face image information that is stored in the payment apparatus when the payment apparatus leaves the NFC radio-frequency field in a first preset time period before the payment apparatus detects the payment event.

In addition, the payment event may further include: identifying a graphic code; or identifying the graphic code, and determining that the graphic code includes payment collection information or payment information, where the graphic code includes at least one of a two-dimensional code and a bar code.

A third application in the storage module invokes an identification function on the terminal to identify the graphic code, where the third application is an application that is included in a whitelist of the storage module and that has a payment function.

The execution module adjusts a tilt angle of a photographing apparatus in the payment apparatus relative to the first plane based on the obtained placement posture information of the payment apparatus, until the tilt angle meets the preset range.

The execution module may specifically be configured to: obtain a first image when determining that the tilt angle meets the preset range; and match the first image with a pre-recorded face image template.

Alternatively, the execution module may specifically be configured to: obtain a first image when determining that the tilt angle meets the preset range; and send the first image to a server, so that the server matches the first image with a pre-recorded face image template in the server.

It should be noted that, when the tilt angle does not meet the preset range, the execution module performs identity authentication in a second manner, where the second manner may include at least one of fingerprint recognition, iris recognition, voiceprint recognition, a digit password, and a pattern password. In addition, when it is determined that the facial recognition fails in verification, the execution module performs identity authentication in the second manner.

The first plane may include at least one of planes that have any included angle with a horizontal plane.

In conclusion, compared with an identity authentication manner in existing mobile payment, the method provided in this embodiment can enable the terminal to determine, when detecting the payment event and based on a current actual status, whether it is convenient to trigger a facial recognition processing unit to verify a user identity, and can use a facial recognition technology with relatively good user experience to verify the user identity to a relatively large extent and relatively efficiently. With the facial recognition technology, an identity authentication operation is completed more naturally and seamlessly. This reduces active input actions of the user, better enhances user experience, and improves identity authentication efficiency during payment.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application.

What is claimed is:

1. A facial recognition-based method for user authentication to open an application on a terminal, implemented by the terminal, wherein the facial recognition-based method comprises:
   detecting a placement posture of the terminal;
   obtaining, using at least one sensor on the terminal, placement posture information of the terminal, wherein the sensor provides a position of the terminal in reference to a horizontal plane or a vertical plane or relative to a second position of a user of the terminal;
   determining, based on the placement posture information, whether a tilt angle of the terminal relative to a first plane is in a preset range;
   triggering, based on the placement posture information, a facial recognition processor of the terminal to perform facial recognition on the user;
   performing, using the facial recognition processor, the facial recognition on the user when the tilt angle is in the preset range without notifying the user of performing the facial recognition, wherein the facial recognition is performed according to triggering the facial recognition processor and regardless of detecting an action of the terminal other than obtaining the placement posture information;
   performing a second recognition process on the user instead of the facial recognition when the tilt angle is not in the preset range, wherein the second recognition process includes at least one of a fingerprint recognition, an iris recognition, a voiceprint recognition, a digit password recognition, and a pattern password recognition; and opening the application when the facial recognition or the second recognition process succeeds, wherein the application includes one of contacts, a phone, a video conference, an email client, instant messaging, personal motion, a camera, image management, a video player, a music player, a calendar, a plug-in, a customized plug-in, searching, a note, a map, or an online video that requires the user authentication.

2. The facial recognition-based method of claim 1, wherein before obtaining the placement posture information of the terminal, the facial recognition-based method further comprises determining that there is no stored face image information on the terminal.

3. The facial recognition-based method of claim 1, wherein before performing the facial recognition on the user, the facial recognition-based method further comprises adjusting the tilt angle of a photographing apparatus in the terminal relative to the first plane based on the placement posture information, until the tilt angle is in the preset range.

4. The facial recognition-based method of claim 1, wherein performing the facial recognition on the user comprises:
   obtaining a first image when the tilt angle is in the preset range; and
   matching the first image with a pre-recorded face image template.

5. The facial recognition-based method of claim 1, wherein performing the facial recognition on the user comprises:
   obtaining a first image when the tilt angle is in the preset range; and
   sending the first image to a server.

6. A terminal, comprising:
   at least one sensor;
   a facial recognition processor;
   a processor coupled to the at least one sensor and the facial recognition processor; and
   a memory coupled to the processor and configured to store instructions that, when executed by the processor, cause the terminal to be configured to:
   detect a placement posture of the terminal;
   obtain, using the at least one sensor, placement posture information of the terminal, wherein the sensor is configured to provide a position of the terminal in reference to a horizontal plane or a vertical plane or relative to a second position of a user of the terminal;
   determine, based on the placement posture information, whether a tilt angle of the terminal relative to a first plane is in a preset range;
   trigger, based on the placement posture information, the facial recognition processor to perform facial recognition on the user;
   perform, using the facial recognition processor, the facial recognition on the user when the tilt angle is in the preset range without notifying the user of performing the facial recognition, wherein the facial recognition is performed according to triggering the facial recognition processor and regardless of detecting an action of the terminal other than obtaining the placement posture information;
   perform a second recognition process on the user instead of the facial recognition when the tilt angle is not in the preset range, wherein the second recognition process includes at least one of a fingerprint recognition, an iris recognition, a voiceprint recognition, a digit password recognition, and a pattern password recognition; and
   open an application when the facial recognition or the second recognition process succeeds, wherein the application includes one or contacts, a phone, a video conference, an email client, instant messaging, personal motion, a camera, image management, a video player, a music player, a calendar, a plug-in, a customized plug-in, searching, a note, a map, or an online video that requires the user authentication.

7. The terminal of claim 6, wherein the instructions further cause the terminal to be configured to determine that there is no stored face image information on the terminal.

8. The terminal of claim 6, wherein the instructions further cause the terminal to be configured to adjust the tilt angle of a photographing apparatus in the terminal relative to the first plane based on the obtained placement posture information of the terminal, until the tilt angle is in the preset range.

9. The terminal of claim 6, wherein to perform the facial recognition on the user, the instructions cause the terminal to be configured to:
   obtain a first image when the tilt angle is in the preset range; and
   match the first image with a pre-recorded face image template.

10. The terminal of claim 6, wherein to perform the facial recognition on the user, the instructions cause the terminal to be configured to:
    obtain a first image when the tilt angle is in the preset range; and
    send the first image to a server.

11. A computer program product comprising computer-executable instructions for storage on a non-transitory computer-readable medium that, when executed by a processor, cause a terminal to:
    detect a placement posture of the terminal;
    obtain, using at least one sensor on the terminal, placement posture information of the terminal, wherein the sensor provides a position of the terminal in reference to a horizontal plane or a vertical plane or relative to a second position of a user of the terminal;
    determine, based on the placement posture information, whether a tilt angle of the terminal relative to a first plane is in a preset range;
    trigger, based on the placement posture information, a facial recognition system of the terminal to perform facial recognition on the user;
    perform, using the facial recognition system, the facial recognition on the user when the tilt angle is in the preset range without notifying the user of performing the facial recognition, wherein the facial recognition is performed according to triggering the facial recognition system and regardless of detecting an action of the terminal other than obtaining the placement posture information;
    perform a second recognition process on the user instead of the facial recognition when the tilt angle is not in the preset range, wherein the second recognition process includes at least one of a fingerprint recognition, an iris recognition, a voiceprint recognition, a digit password recognition, and a pattern password recognition; and
    open an application when the facial recognition or the second recognition process succeeds, wherein the application includes one of contact, a phone, a video conference, an email client, instant messaging, personal motion, a camera, image management, a video player, a music player, a calendar, a plug-in, a customized plug-in, searching, a note, a map, or an online video that requires the user authentication.

12. The computer program product of claim 11, wherein the instructions further cause the terminal to determine that there is no stored face image information on the terminal.

13. The facial recognition-based method of claim 1, wherein the facial recognition is performed according to information of application on the terminal.

14. The facial recognition-based method of claim 1, wherein the facial recognition is performed according to information of the application on the terminal, and wherein the application is a second application in a first application that is opened on the terminal.

15. The terminal of claim 6, wherein the facial recognition is performed according to information of the application on the terminal.

16. The terminal of claim 6, wherein the facial recognition is performed according to information of the application on the terminal, and wherein the application is a second application in a first application that is opened on the terminal.

17. The computer program product of claim 11, wherein the facial recognition is performed according to information of the application on the terminal.

18. The facial recognition-based method of claim 1, further comprising determining whether the application is in a preset application list of the terminal, wherein the preset application list includes preset applications that are determined based on application type or user setting, and wherein the facial recognition is performed when the application is in the preset application list.

19. The facial recognition-based method of claim 1, further comprising triggering, when the tilt angle is not in the preset range, the facial recognition processor with a preset time period to delay performing the facial recognition.

20. The facial recognition-based method of claim 1, wherein the application is preset application on the terminal before delivery of the terminal or a third-party application downloaded and installed by the user from an application market.

* * * * *